(12) United States Patent
Aoki et al.

(10) Patent No.: US 6,503,098 B2
(45) Date of Patent: Jan. 7, 2003

(54) WIRE HARNESS STRUCTURE

(75) Inventors: Hitoshi Aoki, Wako (JP); Toru Soshino, Yokkaichi (JP)

(73) Assignees: Sumitomo Wiring Systems, Ltd., Mie (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,962

(22) Filed: Aug. 2, 2001

(65) Prior Publication Data

US 2002/0019165 A1 Feb. 14, 2002

(30) Foreign Application Priority Data

Aug. 2, 2000 (JP) .......................... 2000-234469
Aug. 8, 2000 (JP) .......................... 2000-240143

(51) Int. Cl.[7] .................... H01R 11/00; H01R 11/09; H01R 9/22; H01R 13/73
(52) U.S. Cl. ................... 439/502; 439/724; 439/949
(58) Field of Search ............... 439/502, 501, 439/505, 623, 624, 949, 723, 724; 174/71 R, 72 A, 72 B, 71 B, 78; 361/826

(56) References Cited

U.S. PATENT DOCUMENTS

| | | | | |
|---|---|---|---|---|
| 4,195,894 A | * | 4/1980 | Kotski | 191/12.4 |
| 4,363,165 A | * | 12/1982 | Suzuki et al. | 29/56.6 |
| 4,577,917 A | * | 3/1986 | Nashimoto et al. | 439/36 |
| 4,941,845 A | * | 7/1990 | Eppley et al. | 361/683 |
| 4,971,576 A | * | 11/1990 | Thimmesch | 219/205 |
| 5,234,360 A | * | 8/1993 | Kramer, Jr. | 439/367 |
| 5,501,605 A | * | 3/1996 | Ozaki et al. | 174/72 A |
| 5,668,415 A | * | 9/1997 | Nagami | 174/72 A |
| 5,829,129 A | * | 11/1998 | Ito | 174/72 A |
| 6,291,770 B1 | * | 9/2001 | Casperson | 174/139 |

\* cited by examiner

*Primary Examiner*—Khiem Nguyen
*Assistant Examiner*—Chandrika Prasad
(74) *Attorney, Agent, or Firm*—Oliff & Berridge, PLC

(57) ABSTRACT

There are provided sub-connectors to which serial data wires, provided on wire harnesses, are connected. These sub-connectors are connected to a joint connector provided in the vicinity of connectors, thereby splicing the wires.

21 Claims, 22 Drawing Sheets

WIRE HARNESS STRUCTURE

BACKGROUND OF THE INVENTION

1. Field of Invention

This invention relates to a wire harness structure for connecting separate (divided) wire harnesses together, and more particularly to a wire harness structure capable of efficiently splicing (Going) wires of the wire harnesses together.

2. Description of Related Art

Electrical equipment mounted on an automobile obtain electric power and a lot of information fed from switch sensors and the like, through wires, and therefore wire harnesses, having a large amount of wires concealed from the view, are installed in the vehicle, Here, the term "wire harness" means a bundle of wires of various kinds joined together by a corrugated tube, a tape or the like.

In view of the productivity and the ability of mounting on a vehicle body, the wire harnesses of suitable lengths are provided in a divided manner, and are mounted respectively at various portions, such as an engine room, an instrument panel a door and a seat, and the wire harnesses are connected together through suitable connection means such as a connector. This is usually referred to as "wire-to-wire connection".

The wire harnesses connecting the electrical equipments are arranged in complicated paths, and therefore, parts of wires forming the wire harnesses need to be spliced, and particularly at the wire-to-wire portion, the wires often need to be spliced over the wire harnesses This has been the cause of an increased number of the wires.

One example of methods of thus splicing wires over a plurality of wire harnesses is shown in FIG. 11.

In FIG. 11, a wire harness 1 is mounted in an engine room, and a wire harness 2 is mounted on an instrument panel. These wire harnesses 1 and 2 are connected together through a connector 3.

A circuit group 4 of the wire harness 1 comprises two wires A and one wire B. and in FIG. 11, the two lower wires B and A are spliced to the uppermost wire A.

As shown in FIG. 13 described in detail later, the wires A, B and C are used in accordance with equipment specifications. More specifically, the wires A are connected to units provided as standard (that is, in all variations), and wires B and C are connected to units provided in accordance with the variations.

As shown in FIG. 11, a circuit group 5 of the wire harness 2 comprises wires A, B and C, and the two lower wires A and C are spliced to the uppermost wire B.

Therefore, these wires A to C are spliced over the wire harnesses 1 and 2 through the connector 3.

As shown in FIGS. 12A and 12B, with respect to the splicing of the wires A to C of the circuit groups 4 and 5, a sheath is removed from an arbitrary portion of a sheathed wire 6, and a wire 7 is connected to this sheath-removed portion, and these connected portions are spliced together by press-deforming a press-fastening member 8.

Assuming that with respect to wire harnesses of this kind, there are four Item Nos. 1 to 4 of splice specifications as shown in FIG. 13, it is necessary to splice the circuit groups 4 and 5 of the wire harnesses 1 and 2 in accordance with the splice specifications (including four Item Nos. 1 to 4) after removing the sheaths from the wires A to C. Therefore, it has been necessary to produce four kinds of circuit groups corresponding respectively to the four Item Nos. 1 to 4, and therefore the production cost of the wire harnesses has increased, and the production has been very cumbersome.

In order to overcome such a disadvantage, methods of splicing wires by the use of a joint connector have been extensively used. One example of such splicing methods is shown in FIG. 14. In FIG. 14, the construction of wire harnesses is similar to that shown in FIG. 11, and therefore, only splice portions will be described.

In FIG. 14, two wires A and one wire B are spliced to a circuit group 10 of a wire harness 1 through a joint connector 100, and one wire A, one wire B and one wire B are spliced to a circuit group 11 of a wire harness 2 through another joint connector 101.

As shown in FIG. 15, each of the joint connectors 100 and 101 comprises a connector 102, into which crimp-type terminals secured respectively to one ends of the wires A to C are inserted, and a bus bar connector 9 containing bus bars 9a.

As shown in FIG. 14, the wires 10 and 11, connected through a connector 3, are connected to the joint connectors 100 and 101, respectively, and the wires A to C are spliced over the wire harnesses 1 and 2 through the wires 10 and 11.

In the splicing method using these joint connectors 100 and 101, merely by connecting the wires A to C to the joint connectors 6 and 7 in accordance with a selected one of the Item Nos. 1 to 4 (as shown in FIG. 13), the wires A to C can be spliced over the wire harnesses 1 and 2 in accordance with the selected Item Number. Therefore, it is not necessary to produce four kinds of wire harnesses corresponding respectively to the four Item Nos. 1 to 4, and there are achieved advantages that the cost of production of the wire harnesses is prevented from increasing, and that the production of the wire harnesses can be carried out easily.

In recent years, the control of automobiles has become more and more advanced, and many ECUs (electronic Control Units) have been mounted on the automobile, and the high-speed transfer of information between the ECUs for an engine, an ABS (Antilock Brake System), a transmission and the like has become indispensable. The transfer of signals between the engine, the ABS, the transmission and the like is enabled by a CAN (Control Area Network) forming a high-speed communication network in the automobile.

This CAN is capable of effecting a multiplex communication (that is, a serial data communication) at high speed, and therefore, the number of wires can be much reduced, and a compact, lightweight design of a wire harness can be achieved.

However, generally, a shielded wire, as shown in FIG. 18A, is used as a communication wire (that is, a serial data wire), used in the CAN, in order to eliminate the effects of noises, and such serial data wires are often spliced over wire harnesses.

One conventional method of splicing serial data wires of this type is shown in FIGS. 16 and 17. Basically, this method also uses joint connectors as in FIG. 14.

In FIGS. 16 and 17, reference numerals 11, 12 and 13 denote wire harnesses, and in view of the productivity and the ability of mounting on a vehicle body, these wire harnesses 11, 12 and 13 of suitable lengths are provided in a divided manner, and are mounted respectively at various portions such as an engine room, a dash panel and an instrument panel.

The wire harnesses 11 to 13 include their respective serial data wires 11a, 12a, 12b, 12c and 13a each including a shielded wire. As shown in FIG. 17B, each of these serial data wires comprises two wires a and b and one drain wire c. This drain wire c forms a metal film, and these wires are collectively covered with a tube.

As shown in FIG. 17A, one end of the serial data wire 11a is connected to an ECU 16, and the other end of this serial data wire 11a is connected to one end of the serial data wire 12a through a connector 14. The other end of this serial data wire 12a is connected to a joint connector 19 containing bus bars.

One end of the serial data wire 12b is connected to an ECU 17, and the other end of this serial data wire 12b is connected to the joint connector 19.

One end of the serial data wire 12c is connected to one end of the serial data wire 13a through a connector 15, and the other end of this serial data wire 12c is connected to the joint connector 19. The other end of the serial data wire 13a is connected to an ECU 18.

The serial data wires 12a to 12c are thus spliced to the joint connector, and with this arrangement the serial data wires 11a, 12a to 12c and 13a are spliced over the wire harnesses 11 to 13 as shown in FIG. 16.

In the connectors 14 and 15, the associated serial data wires, as well as associated wires for supplying power or merely for transmitting signals, are connected together (in a wire-to-wire manner).

The serial data wires 11a, 12a to 12c and 13a are different in length. For example, the serial data wire 11a is 1000 mm in length, and the serial data wire 12a is 700 mm in length. The serial data wires 12b and 12c are 500 mm in length, and the serial data wire 13a is 300 mm in length.

Other forms of serial data wire include a twist pair wire 41, shown in FIG. 18B, and a tubed wire 42 shown in FIG. 18C, and any other suitable form of wire can be used.

In this method of splicing the serial data wires, however, the single serial data wire usually comprises a plurality of wires. and therefore for splicing the serial data wires over the wire harnesses 11 to 13, sheaths are removed from the ends of the serial data wires 11a, 12a, 12c and 13a. Then the terminals are connected to these ends and inserted into the connectors 14 and 15. Therefore, there has been encountered a problem that the time and labor required for the sheath-removing step, the terminal-connecting step and the step of inserting the terminals into the connectors, increase as compared with the case of using simple wires, and the operation for splicing the serial data wires is cumbersome.

More specifically, as shown in an enlarged portion A of FIG. 18A, for connecting the terminals to the shielded wire, the tube is removed, the sheaths are removed from the ends of the two wires a and b, and the drain wire c in the form of a metal film is separated from the end portions of these wires, and is bundled. Thereafter, the terminals are press-fastened to the wires a and b, respectively. With respect to the drain wire c, a sheath is removed from an arbitrary portion of a wire, to which a terminal is beforehand press-fastened. The drain wire c is connected to this sheath-removed portion, and is press-fastened thereto by a press-fastening member. Thus, these operations are required. Incidentally, although terminal-connected portions of shielded wires, shown in FIG. 17, are simplified for convenience, but it will be appreciated that the above-mentioned time and labor are required.

In the illustrated conventional construction, the three wire harnesses 11 to 13 are connected together, and the serial data wires are spliced. In the case where four or more wire harnesses are connected together, there is required an operation in which sheaths are removed from end portions of serial data wires, and then terminals are connected to these ends. Then they are inserted into connectors. Therefore, in this case, there has been encountered a problem that the operation for splicing the serial data wires is more cumbersome.

In addition, the sheaths are removed from the ends of the serial data wires 11a, 12a, 12c and 13a, and the terminals are secured to these ends. Then these serial data wires are connected in a wire-to-wire manner by the connectors 14 and 15 and are spliced by the joint connector 19 for the wire harness 12. Thus, these operations are required, Therefore, the degree of freedom of the splicing position of the serial data wires is lowered, and the serial data wires need to be set to different lengths. In addition, the noise-shielding performance is lowered because of the increased amount of removal of the sheaths.

Further, in such a conventional splicing method, however, it is necessary to provide the wires 11a and 13a for connecting the wire harnesses 12a and 12c together, and to splice the wires A to C by connecting these wires 11a and 13a respectively to the joint connectors 14 and 15. Thus, there are required the two wires 11a and 13a provided over the wire harnesses 12a and 12c, and the number of the wires increases, and therefore, the production of the wire harnesses has become cumbersome.

In the conventional construction, the two wire harnesses 12a and 12c are connected together, thereby splicing the wires. In the case where three or more wire harnesses are connected together, a wire or wires, similar in construction to the wires 11a and 13a, are further needed, and the number of the wires further increases and therefore the production of the wire harnesses has become more cumbersome.

As shown in FIG. 13, in the case where splicing wires A, B and C of two wire harnesses (e.g., 12a and 12c in FIG. 17A) are connected together by a joint connector 6 (or 7), including bus bars 9a (see FIG. 15) having, for example, one input portion and three output portions, there are encountered problems that the joint connector 6 (or 7) has an increased size and that a large space is needed for mounting the large-size joint connector 6 (or 7) on a vehicle body panel.

SUMMARY OF THE INVENTION

It is therefore an object of this invention to provide a vehicle wiring construction or a wire harness structure in which the efficiency of an operation for splicing data communication wires, preferably in the form of serial data wires, can be enhanced, and the degree of freedom of the splicing position of the serial data wires can be enhanced, thereby enhancing the degree of freedom of setting of wire lengths. In addition, the amount of removal of sheaths from the serial data wires can be reduced, thereby enhancing the noise shielding performance.

To solve the above problems, the present invention provides a vehicle wiring construction that includes a plurality of sub wire harnesses each having an end connector. The sub wire harnesses are configured to be connected to each other when the end connectors are coupled to each other. Each sub wire harness has at least one joint wire attached thereto. At least one joint connector is provided, and is configured to hold and electrically interconnect the joint wires that are respectively attached to the sub wire harnesses. The at least one joint connector is configured to be positioned away from the end connectors so that the joint wires can be connected independently to the at least one joint connector without being connected to the end connectors.

In another aspect of the present invention, the at least one joint wire comprises at least one data communication wire. The data communication wires are configured to respectively extend between the at least one joint connector and electronic control units to transmit data to a respective one of the electronic control units. Accordingly, the electronic control units can be intercommunicated via the at least one joint connector. Preferably, the data communication wire is a serial data communication wire, and is formed from either one of a shielded wire, a twist pair wire or a tubed wire.

In a further aspect of the present invention, the data communication wires are of substantially the same length. Consequently, electrical characteristics of data communication between the electronic control units can be substantially the same.

In a further aspect of the present invention, the vehicle wiring construction has a sub-connector for receiving and holding the at least one joint wire attached to the sub wire harness. The sub-connectors are configured to be accommodated within the joint connector.

In a further aspect of the present invention, the at least one joint connector is mounted on an electrical connection box positioned in the proximity of the end connectors. Alternatively, the at least one joint connector may be mounted on a bracket of a vehicle body positioned in the proximity of the end connectors, or may be mounted at any suitable location such as the one at one of the sub wire harnesses, preferably in the proximity of the end connectors.

In another aspect of the present invention, the at least one joint connector is formed unitarily in one piece with an electrical connection box positioned in the proximity of said end connectors, and forms a joint wiring configuration to electrically interconnect the joint wires and an internal circuit of the electrical connection box.

Further, the present invention provides a wire harness structure in which a wire harness, including a serial data wire for effecting a serial data communication, is divided, and the divided wire harnesses are connected together through connection means, and a part of the serial data wire are spliced over the plurality of divided wire harnesses without being connected to the connection means. There is provided a sub-connector to which ends of the part of the serial data wire are connected. There is provided a joint connector for splicing the serial data wires disposed respectively within the sub-connector.

In this case, the serial data wires, provided on the wire harnesses, are connected to the sub-connector, and this sub-connector is connected to the joint connector. By doing so, the serial data wires, provided respectively on the plurality of wire harnesses, can be spliced over the wire harnesses.

As a result, a conventional operation, in which sheaths are removed from the end portions of the serial data wires, and then these end portions are connected to a connector, can be minimized. Therefore, the efficiency of the operation for splicing the serial data wires can be enhanced. Moreover, the end portions of the serial data wires do not need to be connected to the wire-to-wire connector which connects the wire harnesses together. Therefore, the splicing position of the serial data wires is prevented from being limited, and the degree of freedom of the splicing position of the serial data wires can be enhanced.

For installing the wire harnesses on the vehicle body, the serial data wires, provided respectively on the divided wire harnesses, are connected to the sub-connector, and the sub-connector is connected to the joint connector at the time of installing these wire harnesses on the vehicle body. By doing so, the serial data wires can be easily spliced. Therefore, the serial data wires can be easily connected to the proper portion of the joint connector in a collected manner.

In the invention, in order to solve the above problems, the serial data wire may be a shielded wire.

In the invention, in order to solve the above problems, the serial data wire may be a twist pair wire.

In the invention, in order to solve the above problems, the serial data wire may be a tubed wire.

Any one of the above serial data wires has noise-shielding properties, and therefore the noise-shielding performance can be positively enhanced.

In the invention, in order to solve the above problems, the serial data wires may be set to generally about the same length.

In this case, one end portions of the serial data wires are spliced at the joint connector while the other ends of these serial data wires are connected respectively to ECUs. The serial data wires may be set to generally about the same length. By doing so, high-speed communications can be effected in such a manner that impedance characteristics between the ECUs are kept constant through the serial data wires, and stable data communications can be effected in a stable, highly-precise manner.

In the invention, in order to solve the above problems, the joint connector may be provided in the vicinity of the connection means.

In this case the joint connector may be provided in the vicinity of the connection means through which the wire harnesses are connected together, and therefore, the connection between the wire harnesses and the splicing of the serial data wires can be effected at one time in a common space on the vehicle body at which only a narrow installation space is available because of the layout of the equipments and the like.

In the invention, in order to solve the above problems, the joint connector may be mounted on an electrical part fixedly mounted on the vehicle body.

In this case, if any electrical part, such as an ECU, a junction box, a relay box, a fuse box, a radio, a clock and various meters, can be provided in the vicinity of the connection means, and the joint connector may be mounted on this electrical part. By doing so, the region, at which electric power is supplied to the wire harnesses, and the region, at which the joint connector is fixedly mounted, can be set to the same region. Therefore, the space required for mounting the joint connector can be reduced.

In the invention, in order to solve the above problems, the joint connector may be mounted on a bracket mounted on the vehicle body.

In this case, when the bracket may be mounted on an arbitrary portion of the vehicle body, the position of mounting of the connection means is not limited, and the degree of freedom of the mounting position of the connection means can be increased.

In the invention, in order to solve the above problems, the joint connector may be mounted on an arbitrary one of the wire harnesses disposed in the vicinity of the connection means.

In this case, the joint connector can be fixed without the need for mounting any bracket on the vehicle body.

In the invention, in order to solve the above problems, the joint connector may contain a branch wiring for splicing a maximum of three serial data wires.

In this case, the joint connector can be formed into a compact, lightweight design, and therefore, the joint connector can be arranged easily by mounting the joint connector directly on the wire harness by a tape or on the nearby electrical part, so that the operations for installing and mounting the wire harnesses, including the serial data wires, can be effected easily.

The joint connector, serving as the splicing portion for the serial data wires, can be arranged freely, and therefore, the installation of the serial data wires can be simplified, thereby enhancing the efficiency of the mounting operation. In addition, each of the relatively-expensive serial data wires can be connected to the unit in the shortest path, thereby reducing the cost.

In the invention, in order to solve the above problems, the joint connector may be formed unitarily in one piece or integrally with an electronic unit, and contains a branch wiring for splicing two serial data wires and an internal circuit of the electronic unit.

In this case, the wire harness-connecting operation at the connector portion, the serial data wire-splicing operation, and the operation for connecting the electronic unit to ordinary wires can be effected at one time, and the efficiency of the operation for mounting the structure on the vehicle body can be further enhanced. In addition, the number of the serial data wires for respectively transferring serial data to the electronic units can be reduced, thereby further reducing the cost.

It is therefore an object of this invention to provide a wire harness structure in which the number of splicing wires may be prevented from increasing, thereby enabling the easy production of a wire harness, and besides the efficiency of an operation, in which the wire harness is mounted on a vehicle body, with the splicing wires easily collected, can be enhanced, and the cost of the wire harness structure is reduced.

Further more, the present invention provides a wire harness structure wherein a wire harness, including a plurality of wires, is divided, and the divided wire harnesses are connected together through connection means. The structure includes sub-connectors, which are separate from the connection means and to which ends of part of the wires of the divided wire harnesses are connected, and a joint connector, which is provided in the vicinity of the connection means so as to splice the wires disposed within the sub-connectors. The part of the wires of the wire harnesses are spliced together by the joint connector over the divided wire harnesses.

In this case, part of the wires of the divided wire harnesses may be connected to the sub-connectors, and these sub-connectors may be connected to the joint connector provided in the vicinity of the connection means. By doing so, part of the wires of the divided wire harnesses can be spliced over the wire harnesses.

As a result, splicing wires for connecting the wire harnesses together as in the conventional construction are not necessary, and the number of the wires is reduced. Thus, the production of the wire harness can be carried out easily.

For mounting the wire harnesses on a vehicle body, these wire harnesses can be supplied to a manufacturer in such a manner that parts of the wires, provided on the wire harnesses are connected to the sub-connectors, and therefore on the part of the manufacturer, the wires can be easily spliced together merely by connecting the sub-connectors to the joint connector. Therefore, the wires can be easily connected to the proper portion of the joint connector in a collected manner.

The joint connector may be provided in the vicinity of the connection means through which the divided wire harnesses are connected together, and therefore, the connection between the wire harnesses and the splicing of the wires can be effected in a common space on the vehicle body, at which only a narrow installation space is available because of the layout of electrical equipments, an engine and the like.

The joint connector for splicing purposes can be separate from the connection means. Therefore, the joint connector of high versatility can be formed into a compact and lightweight design, the cost is low, and the installation space for the joint connector can be reduced.

In the invention, in order to solve the above problems. the joint connector may be mounted on an electrical part fixedly mounted on a vehicle body.

In this case, if any electrical part, such as a fuse box, is provided in the vicinity of the connection means, the joint connector may be mounted on this electrical part. By doing so, the region, at which electric power is supplied to the wire harnesses, and the region, at which the joint connector is fixedly mounted, can be set to the same region, and the space required for mounting the joint connector can be reduced.

In the invention, in order to solve the above problems, the joint connector may be mounted on a bracket fixedly mounted on the vehicle body.

In this case, when the bracket is mounted on an arbitrary portion of the vehicle body, the position of mounting of the connection means is not limited, and the degree of freedom of the mounting position of the connection means can be increased.

In the invention, in order to solve the above problems, the joint connector may be mounted on the wire harness disposed in the vicinity of the connection means.

In this case, the joint connector can be fixed without the need for mounting any bracket on the vehicle body.

BRIEF DESCRIPTION OF TEE DRAWINGS

FIGS. 18A to 18C are views of serial data wires, in which FIG. 18A is a view showing a shielded wire and enlarged portions A and B thereof; and FIG. 18B is a view of a twist pair wire; and FIG. 18C is a view of a tube wire;

Figure 25A:
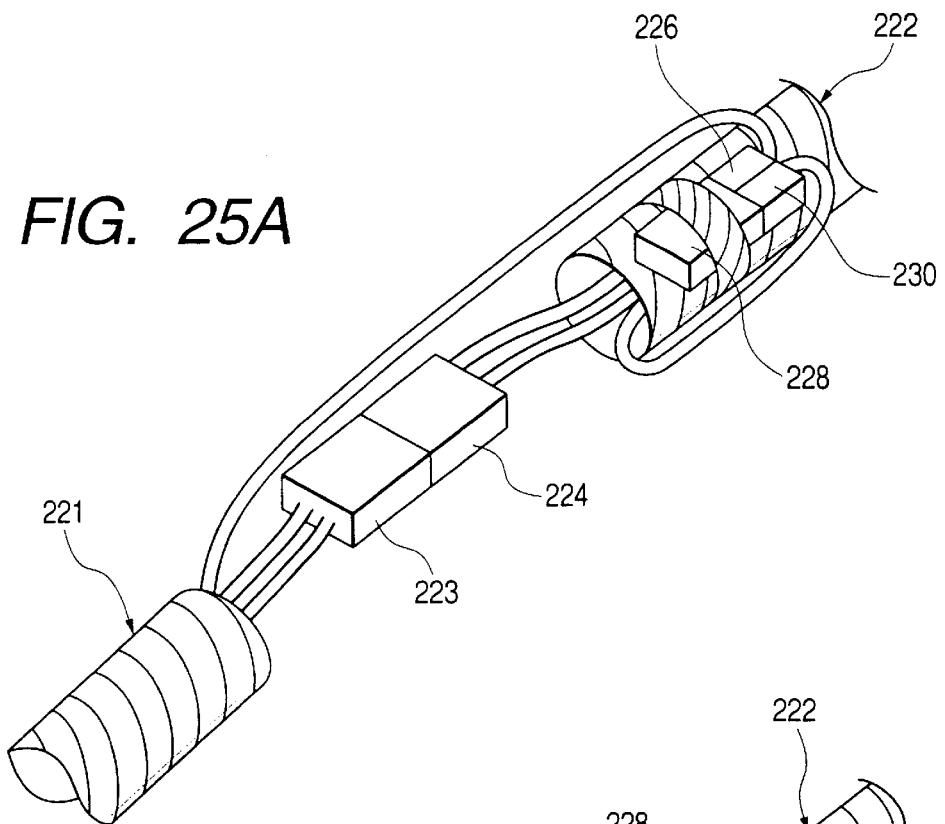
Figure 25B:
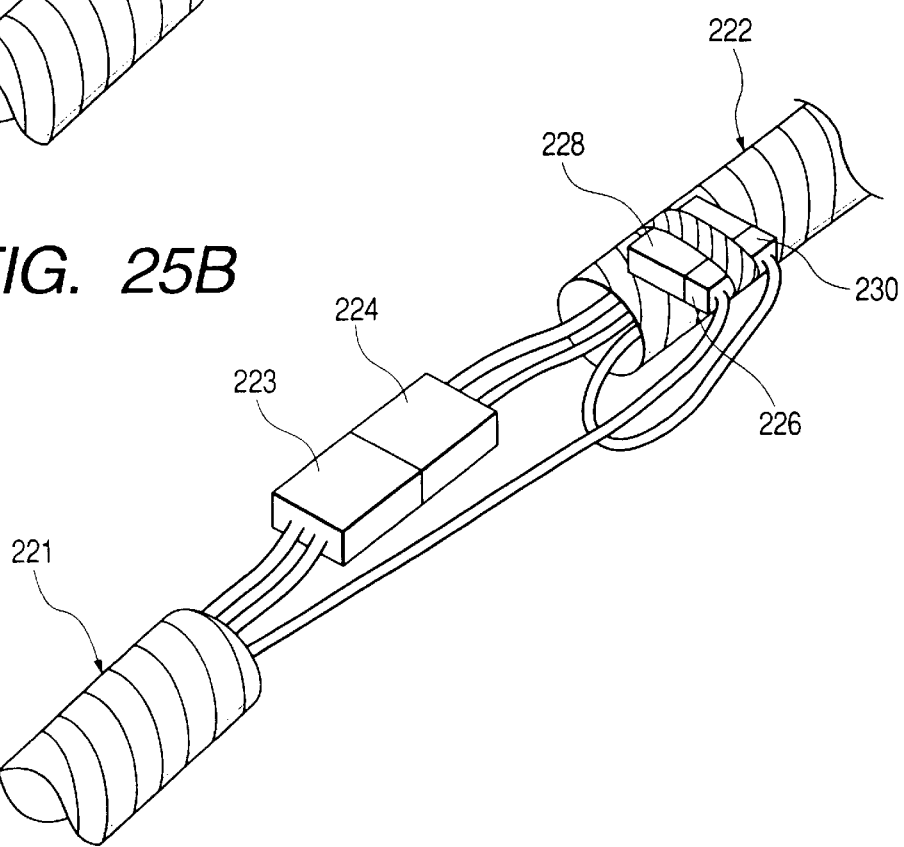
Figure 26:
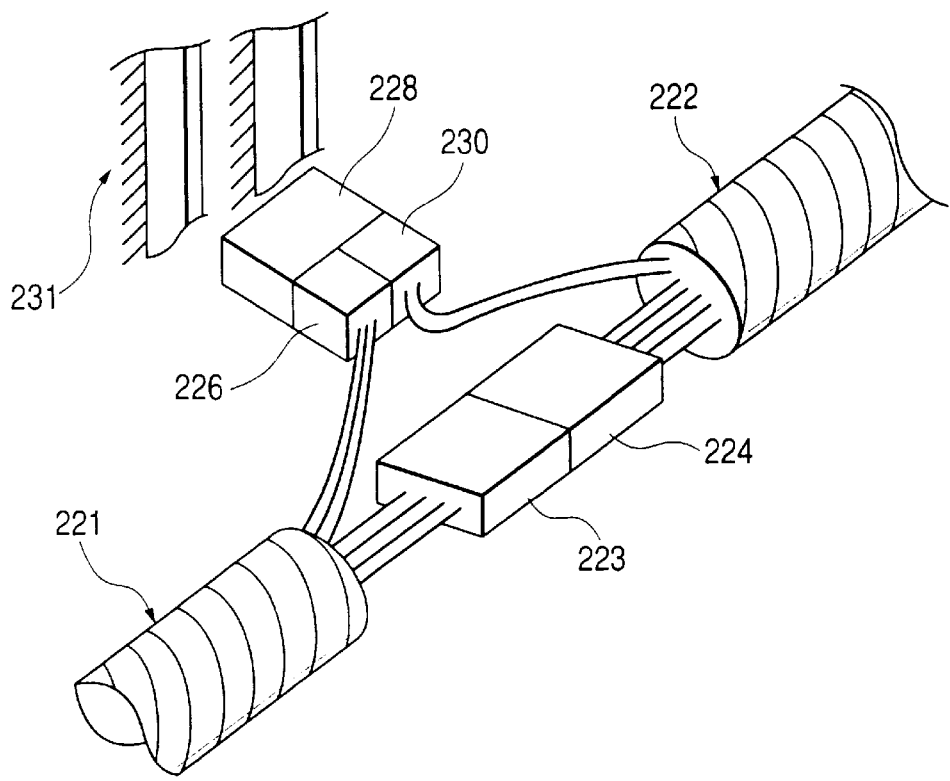
Figure 27:
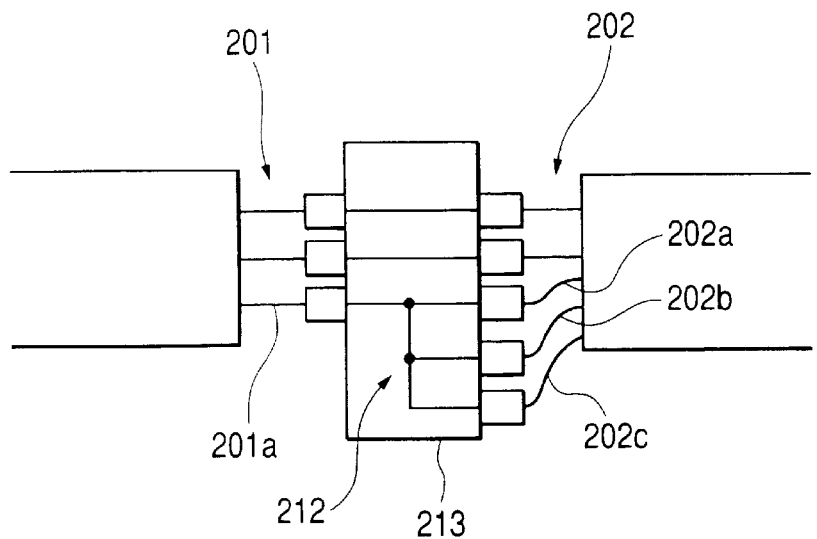

FIGS. 25A and 25B are views showing a condition in which the joint connector of the above embodiments is mounted on the wire harness, in which FIG. 25A shows a condition in which a direction of connection of sub-connectors to the joint connector is the same as the direction of extending of a wire harness; and FIG. 25B shows a condition in which the direction of connection of the sub-connectors to the joint connector is perpendicular to the direction of extending of the wire harness;

FIG. 26 is a view showing a condition in which the joint connector of the above embodiments is provided in the vicinity of an obstacle; and FIG. 27 is a view showing a condition in which wire harnesses are connected together by a conventional joint connector.

FIGS. 1A to 8 show the first embodiment of a wire harness structure of the present invention, and the wire harness structure of this embodiment forms a CAN (Control Area Network) for effecting a serial data communication.

Figure 4A:
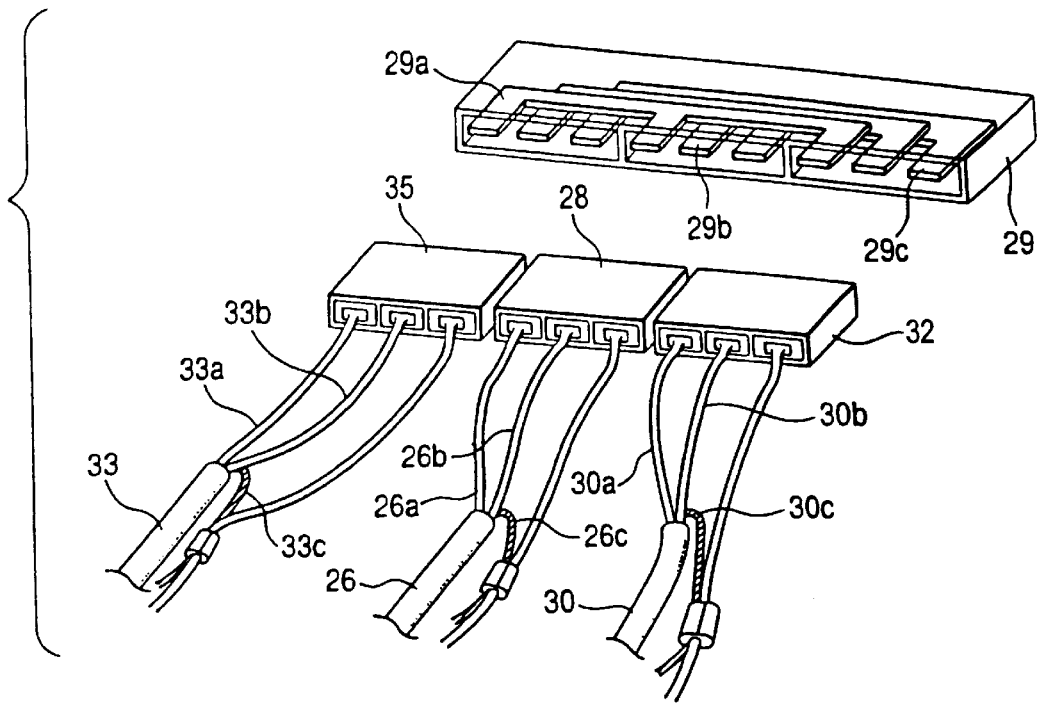
FIG. 4A is a view showing a joint connector, sub-connectors and the serial data wires of the first embodiment.

The other end of the shielded wire 30 is connected to a sub-connector 32, and terminals, connected respectively to the wires 30a to 30c, are adapted to be inserted into this sub-connector 32 as shown in FIG. 4A. This sub-connector 32 is adapted to be connected to the joint connector 29, and the wires 30a to 30c are spliced by the joint connector 29.

The other end of the shielded wire 33 is connected to a sub-connector 35, and terminals, connected respectively to the wires 33a to 33c, are adapted to be inserted into this sub-connector 35 as shown in FIG. 4A. This sub-connector 35 is adapted to be connected to the joint connector 29, and the wires 33a to 33c are spliced by the joint connector 29.

Figure 9:
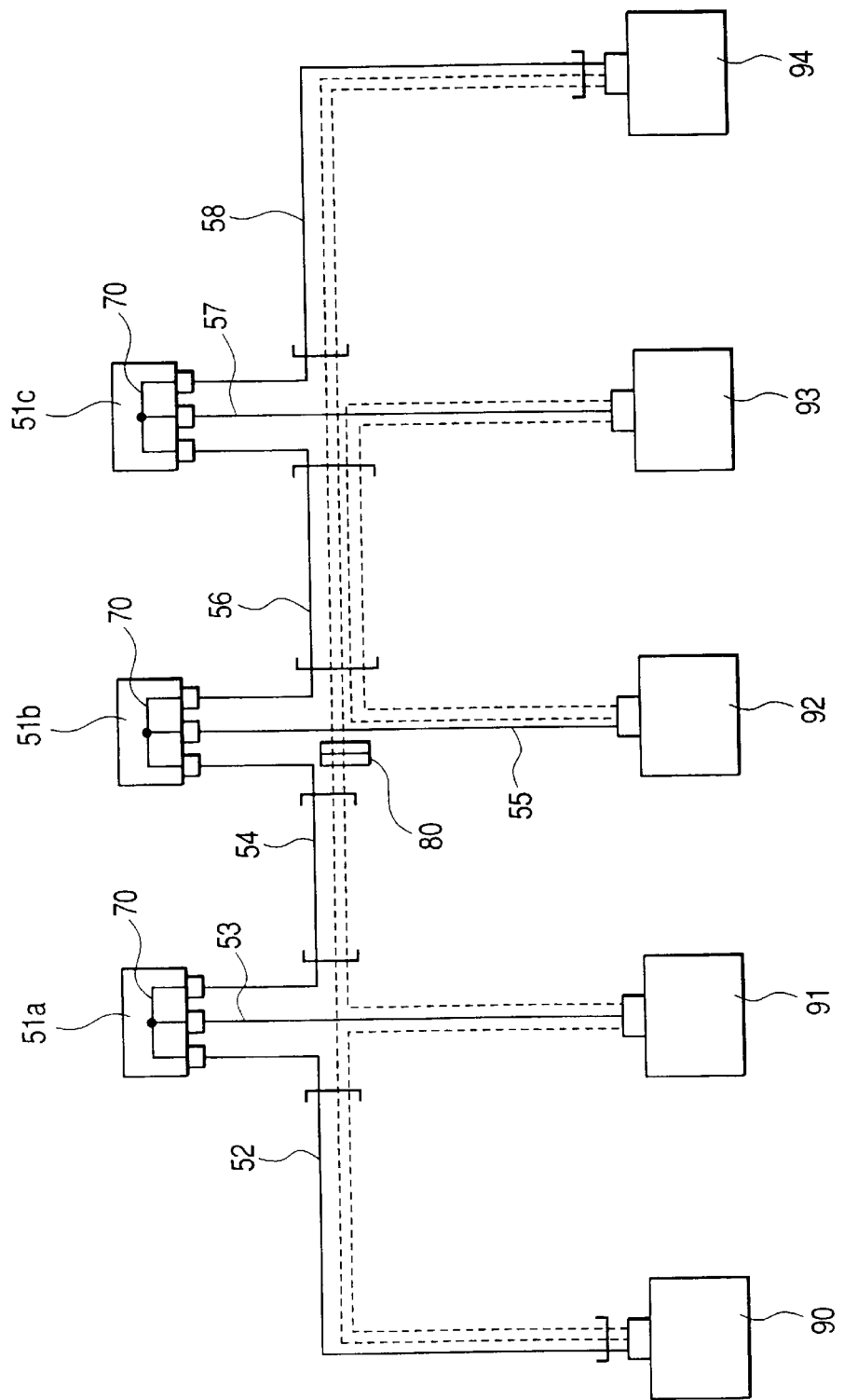
FIG. 9 is a view of second embodiment of a wire harness structure of the invention, showing divided shielded wires.
Figure 10:
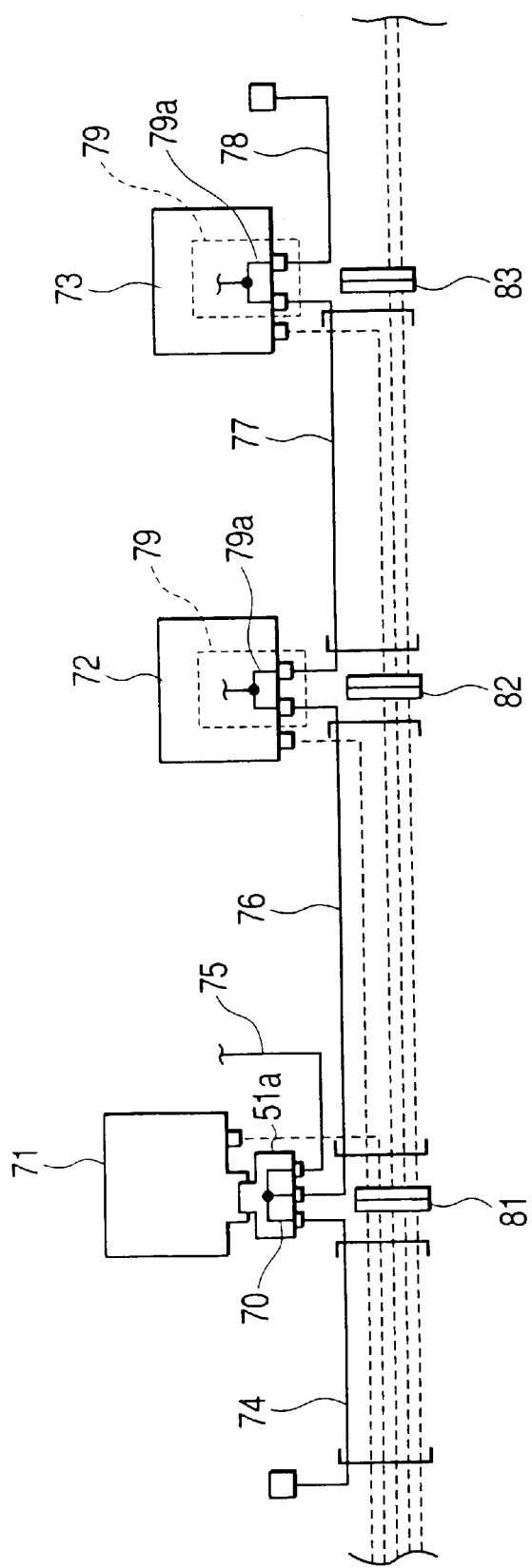
FIG. 10 is a view showing a condition in which the divided shielded wires of the second embodiment are connected to electrical parts.
Figure 11:
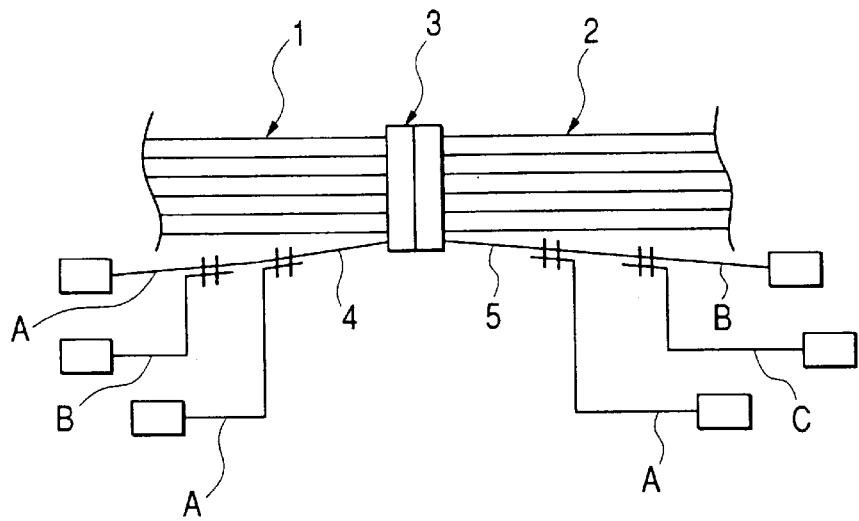
FIG. 11 is a view showing a conventional wire harness structure.
Figure 12A:
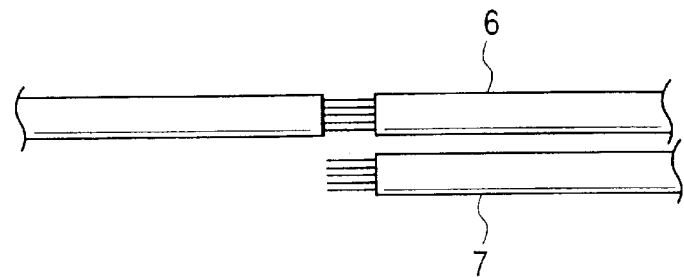
FIG. 12A is a view showing the manner of splicing a wire to a sheath-removed portion of a wire.
Figure 12B:
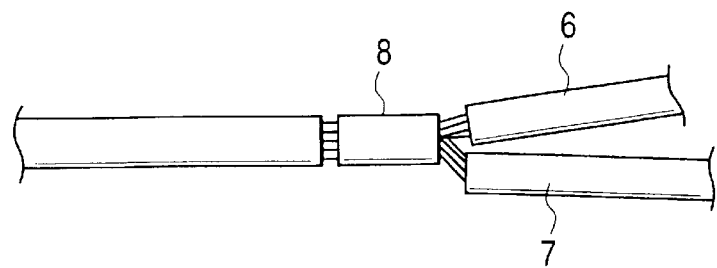
FIG. 12B is a view showing a condition in which connected portions of the wires of FIG. 12A are fastened together.
Figures 13, 14:
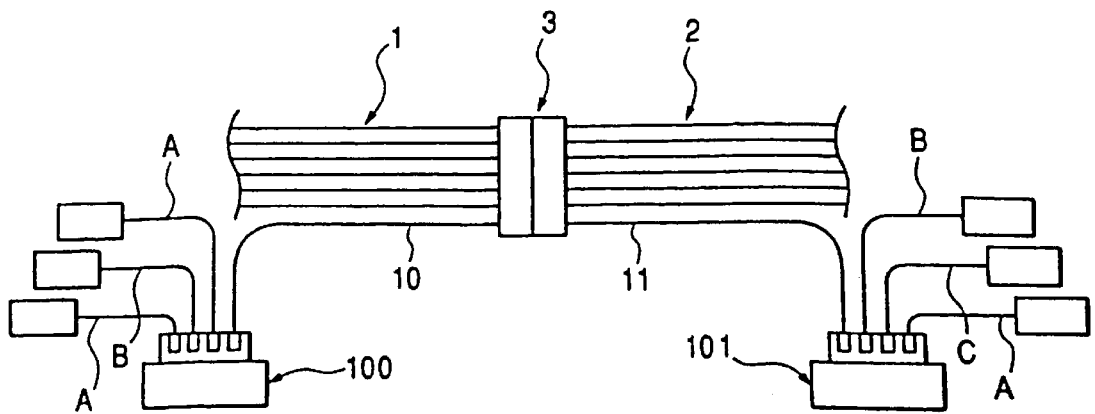
FIG. 13 is a diagram showing the relation between Item Nos. and equipments in a conventional structure.
FIG. 14 is a view showing another conventional wire harness structure.
Figure 15:
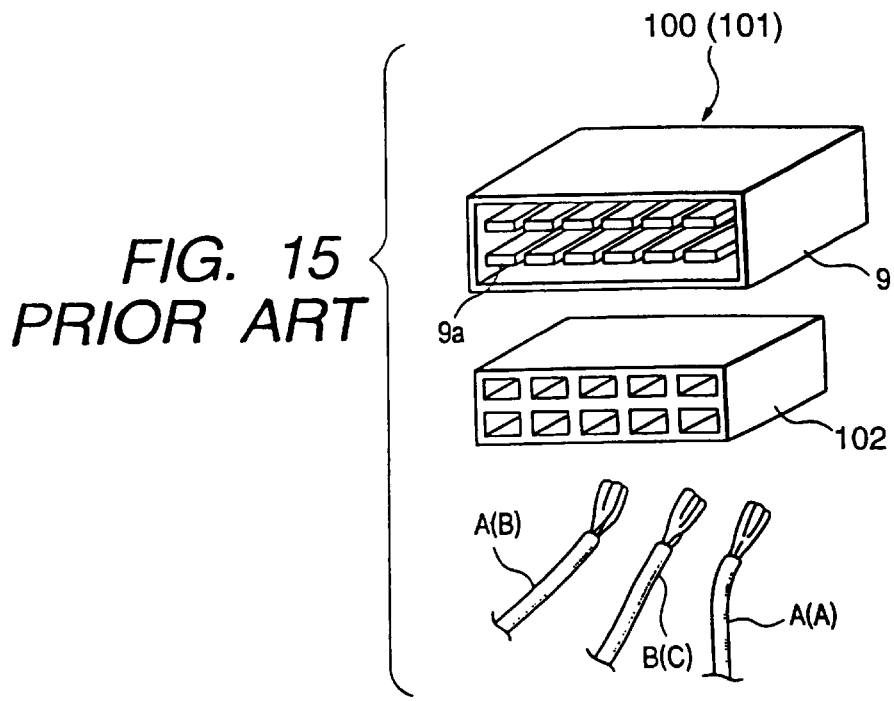
FIG. 15 is a view showing a commonly-used joint connector.
Figure 16:
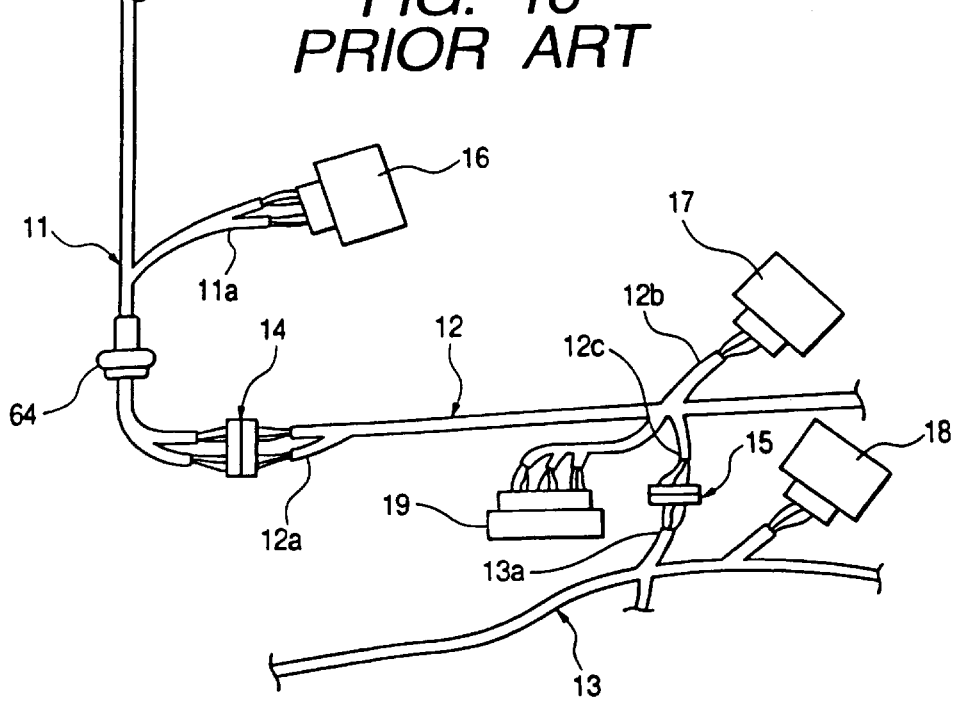
FIG. 16 is a wire harness structure having conventional serial data wires.
Figure 17A:
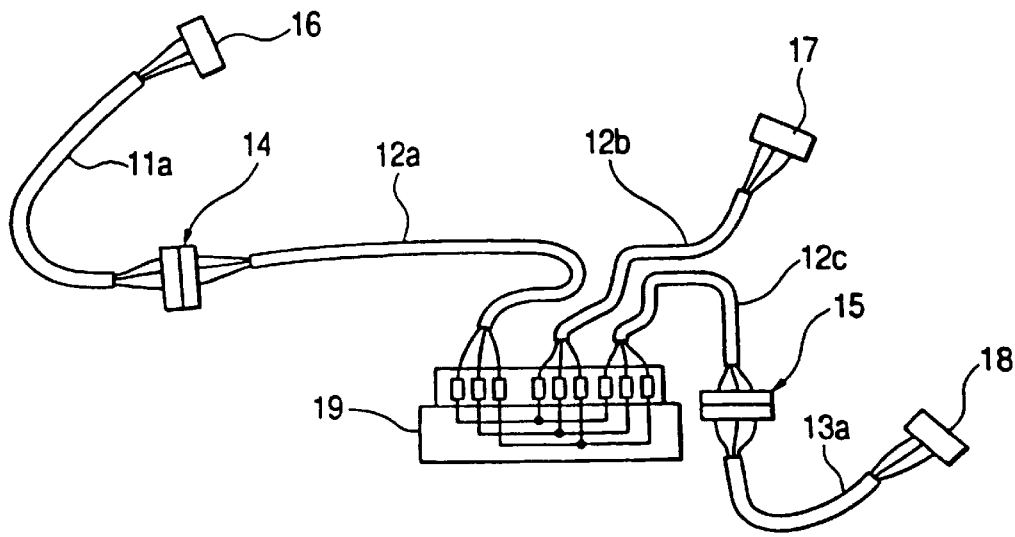
FIG. 17A is a view showing a structure of connecting the serial data wires in the wire harness structure of FIG. 16.
Figure 17B:
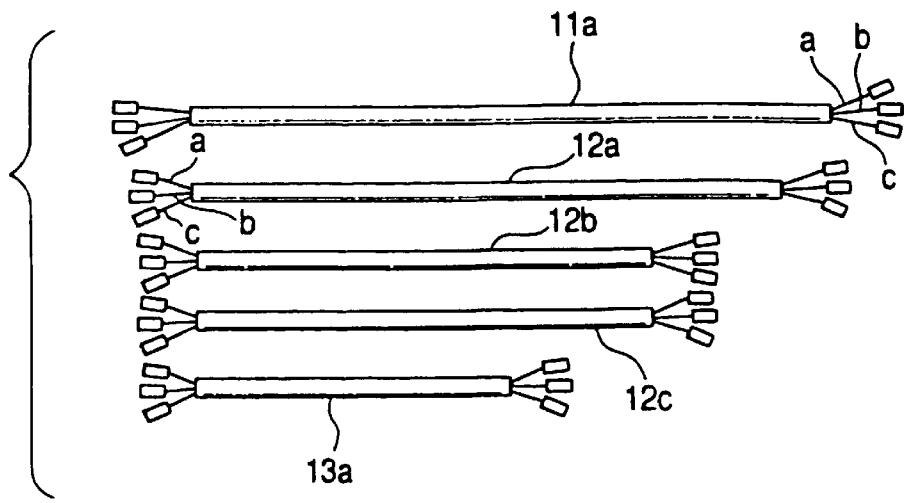
FIG. 17B is a view showing lengths of the serial data wires.
Figure 19:
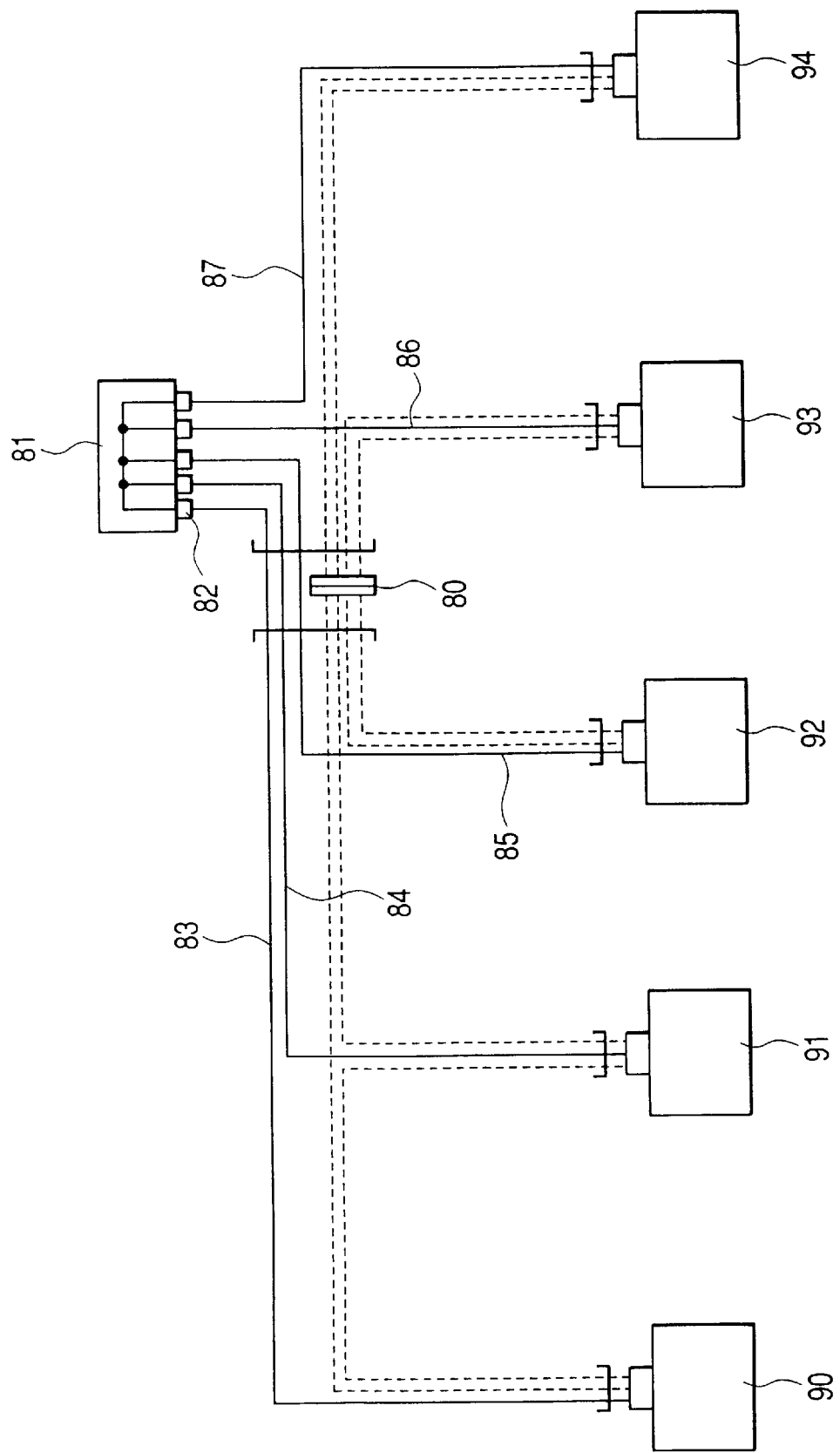
FIG. 19 is a wire harness structure for comparison with the embodiment of present invention shown in FIG. 9.

FIGS. 9 and 10 show a second embodiment of a wire harness structure of the present invention. For comparison purposes, FIG. 19 shows a structure merely embodying one embodiment of the invention.

FIGS. 20 to 26 show a third embodiment of a wire harness structure of the present invention.

DETAILED DESCRIPTION OF PREFERRED EMBODIMENTS

A preferred embodiment of the present invention will now be described with reference to the drawings, FIGS. 1A to 9 show the first embodiment of a wire harness structure of the present invention, and the wire harness structure of this embodiment forms a CAN (Control Area Network) for effecting a serial data communication.

First, the construction will be described In FIGS. 1A to 3, reference numerals 21, 22 and 23 denote wire harnesses. In view of the productivity and the ability of mounting on a vehicle body, these wire harnesses 21, 22 and 23 of suitable lengths are provided in a divided manner and are mounted respectively at various portions, such as an engine room 61, a dash panel 62 and an instrument panel 63 (see FIG. 2). In this embodiment, the wire harness 21 is mounted in the engine room 61, and the wire harness 22 is mounted on the dash panel 62, and the wire harness 23 is mounted on the instrument panel 63. FIG. 2 shows a front seat portion of the vehicle body, and in FIGS. 1A, 1B and 2, reference numeral 64 denotes a grommet.

Connectors 24 and 25, serving as connection means for affecting a wire-to-wire connection, are mounted respectively on ends of the wire harnesses 21 and 22, and the wire harnesses 21 and 22 are connected together through these connectors 24 and 25.

The wire harness 21 includes a shielded wire 26 serving as a serial data wire, and as shown in FIG. 4A, this shielded wire 26 includes two wires 26a and 26b, and a drain wire 26c forming a metal film. These wires may be covered with a tube.

Figure 1A:
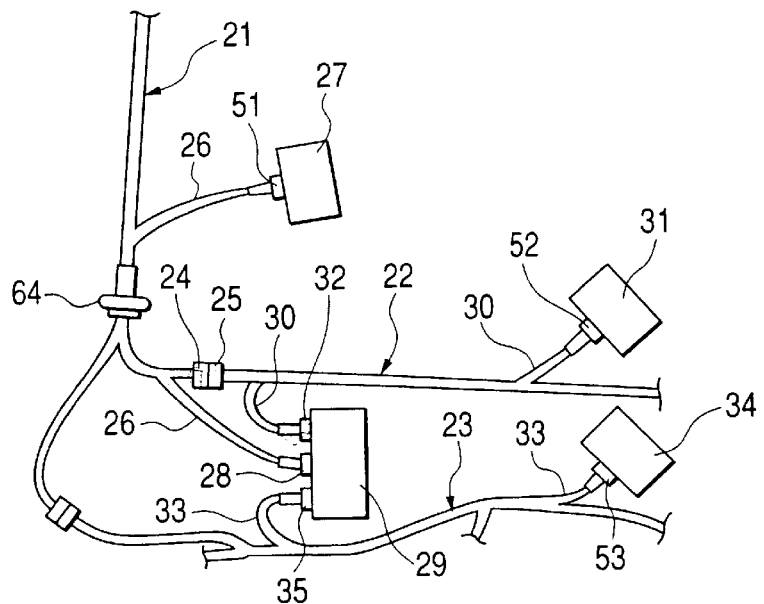
FIG. 1A is a plan view of a first embodiment of a wire harness structure of the invention.
Figure 1B:
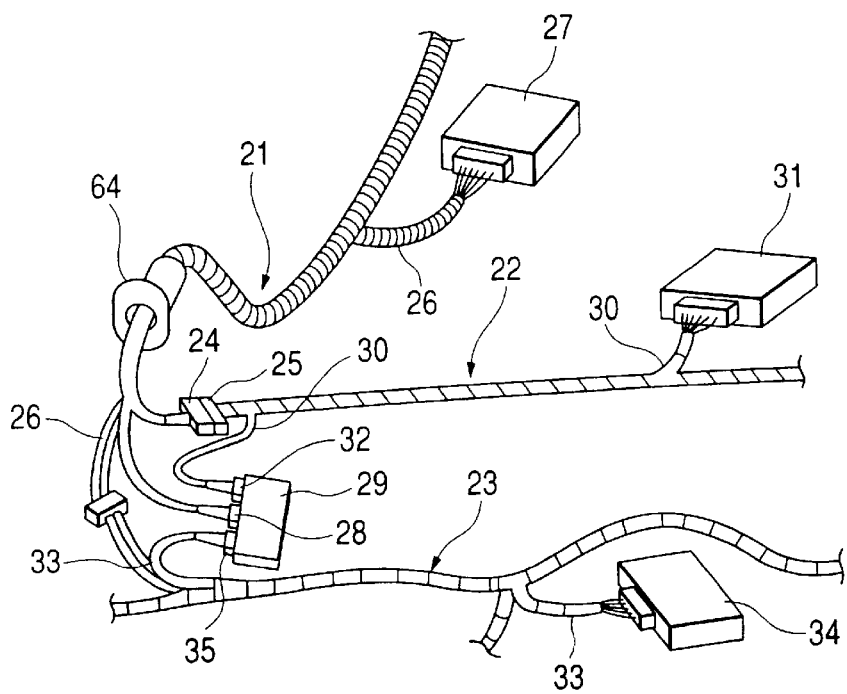
FIG. 1B is a perspective view thereof.
Figure 2:
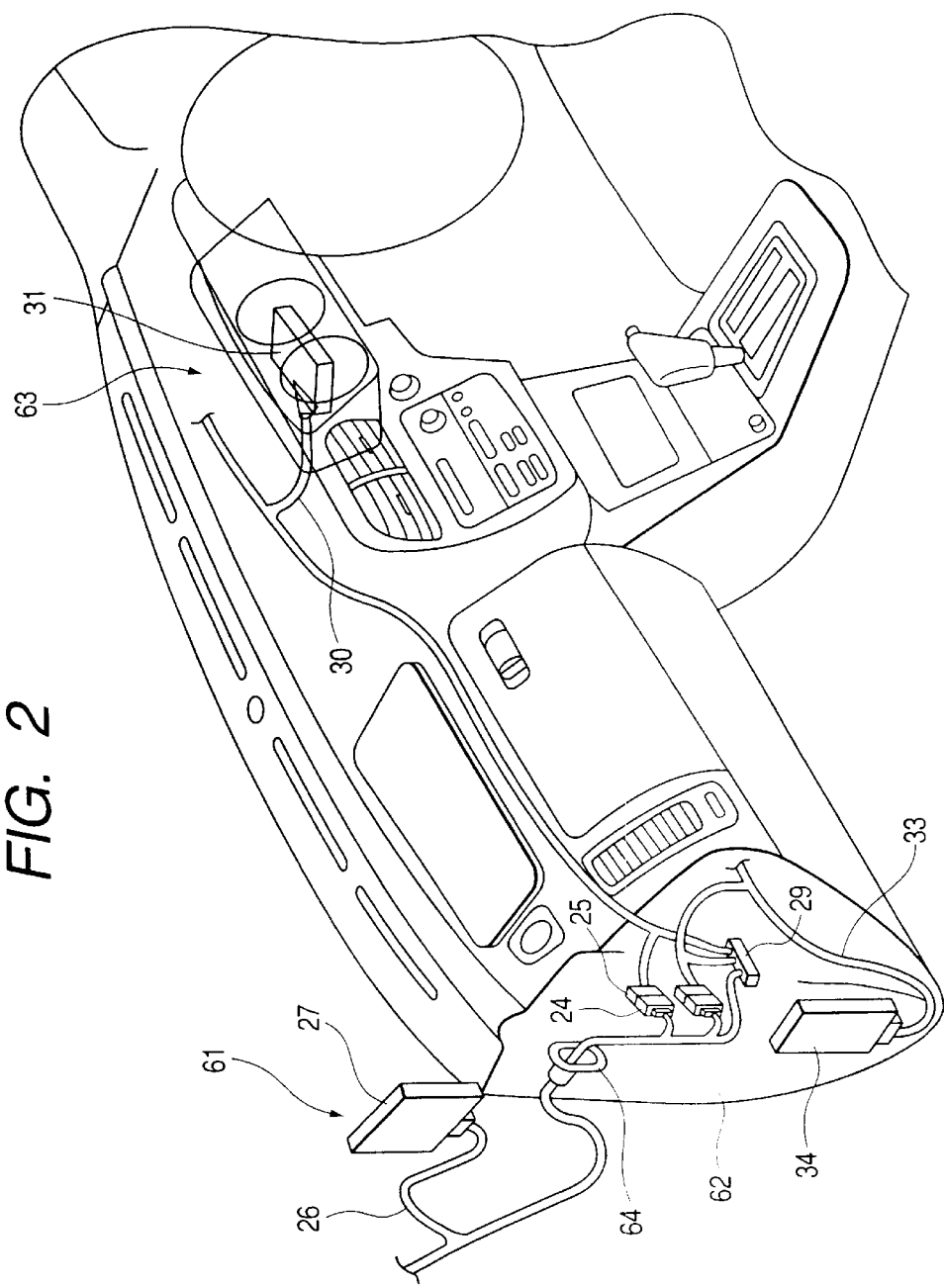
FIG. 2 is a view showing the wire harness structure of the first embodiment mounted on a vehicle body.

As shown in FIG. 1A, a connector 51 may be mounted on one end of this shielded wire 26, and this connector 51 is adapted to be connected to a device, such as an A/T ECU (Automatic Transmission Electronic Control Unit) 27 for controlling an automatic transmission.

Figure 18A:
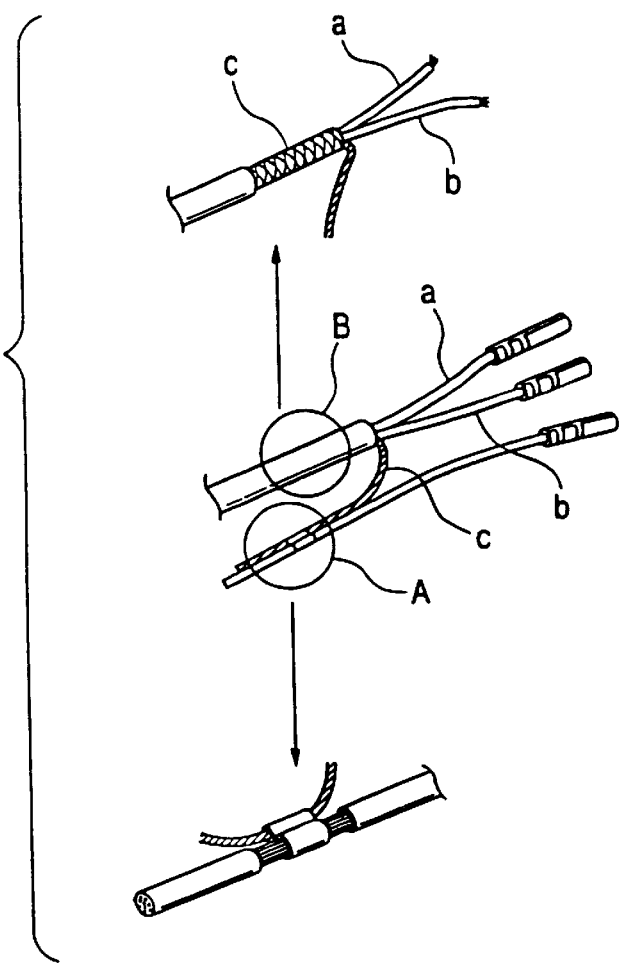

The other end of the shielded wire 26 is connected to a sub-connector 28, and terminals, connected respectively to the wires 26a to 26c, are adapted to be inserted into this sub-connector 28 as shown in FIGS. 4A and 18A. The sub-connector 28 is adapted to be connected to a joint connector 29 containing bus bars 29a to 29c serving as branch wiring. The wires 26a to 26c are spliced to other two shielded wires by the joint connector 29.

The wire harness 22 includes at least one shielded wire 30, and as shown in FIG. 4A, this shielded wire 30 includes two wires 30a and 30b, and a drain wire 30c forming a metal film, and these wires 30a, 30b and 30c are covered with a tube.

A connector 52 is mounted on one end of this shielded wire 30, and this connector 52 is adapted to be connected to a meter ECU 31 for controlling an indication in a meter.

The other end of the shielded wire 30 is connected to a sub-connector 35, and terminals, connected respectively to the wires 30a to 30c, are adapted to be inserted into this sub-connector 35 as shown in FIG. 4A. This sub-connector 35 is adapted to be connected to the joint connector 79. and the wires 30a to 30c are spliced by the joint connector 29.

The wire harness 23 includes one shielded wire 33 (see FIG. 1), and as shown in FIG. 4, this shielded wire 33 comprises two wires 33a and 33b, and a drain wire 33c forming a metal film, and these wires 33a, 33b and 33c may be covered with a tube.

A connector 53 is mounted on one end of this shielded wire 33, and this connector 53 is adapted to be connected to, for example, an FI (Fuel Injection) ECU 34 for controlling an engine as shown in FIG. 2.

The other end of the shielded wire 33 is connected to a sub-connector 32, and terminals, connected respectively to the wires 33a to 33c, are adapted to be inserted into this sub-connector 32 as shown in FIG. 4A. This sub-connector 32 is adapted to be connected to the joint connector 29, and the wires 33a to 33c are spliced by the joint connector 29.

Figure 4B:
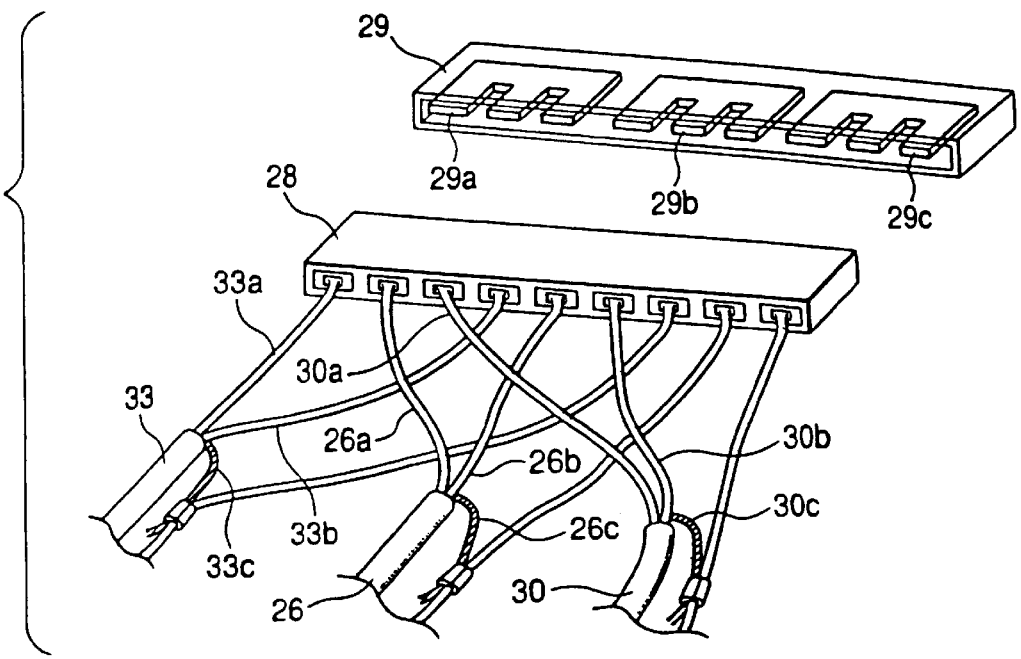
FIG. 4B is a view showing a joint connector, a sub-connector and serial data wires in a modified construction.

FIG. 4B shows a modified form of the invention which differs from the arrangement of FIG. 4A in that only one sub-connector 28 is provided.

As a result, the shielded wires 26, 30 and 33 are spliced by the joint connector 29.

In FIGS. 4A and 4B, the shielded wires are used as the serial data wires, and therefore, the three bus bars 29a, 29b and 29c, insulated from one another, are contained in the joint connector 29. However, in the case where twist pair wires 41 (shown in FIG. 18B) or tubed wires 42 (shown in FIG. 18C) are used as the serial data wires, it will readily be appreciated that two bus bars are contained in the joint connector.

Figure 3A:
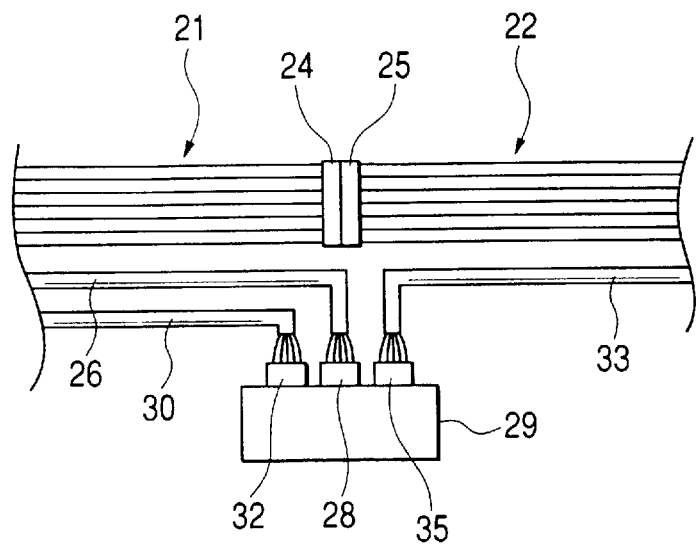
FIG. 3A is a schematic view showing the wire harness structure of the first embodiment.
Figure 3B:
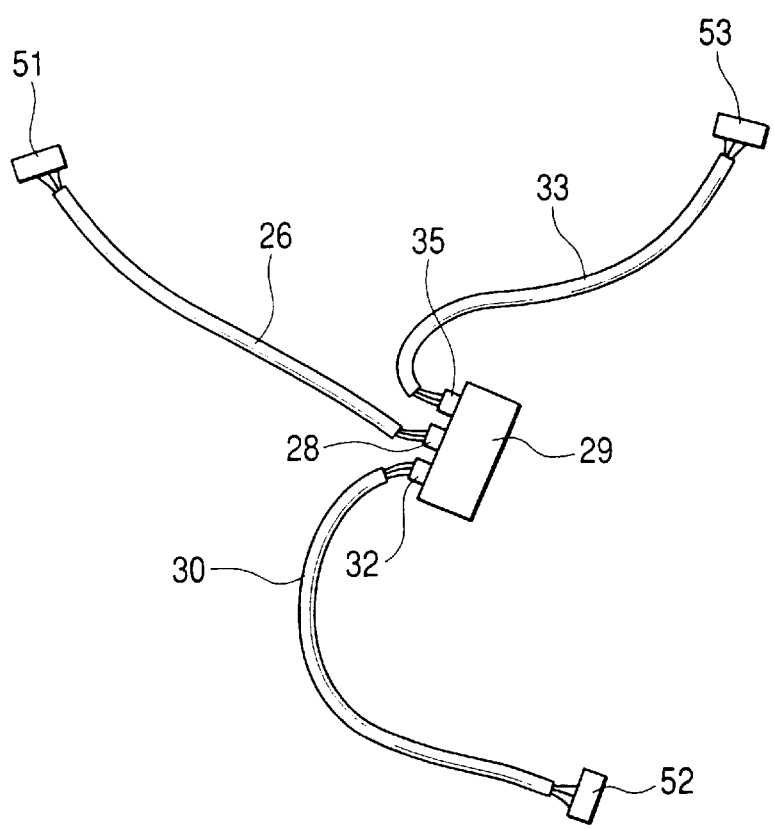
FIG. 3B is a construction view of serial data wires.

In this embodiment, the shielded wires 26, 30 and 33 have generally about the same length (e.g., 1200 mm) as shown in FIG. 3B, and information and control signals are transferred between the ECUs 27, 31 and 34 at high speed.

Figure 5:
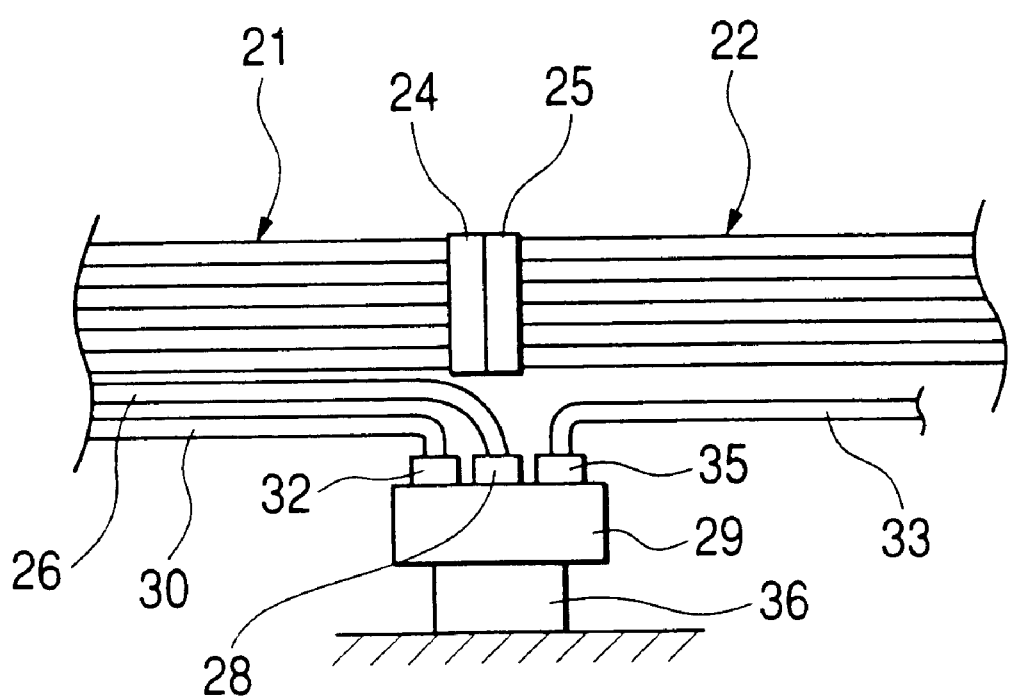
FIG. 5 is a view showing the joint connector of the first embodiment mounted on a bracket.
Figure 6A:
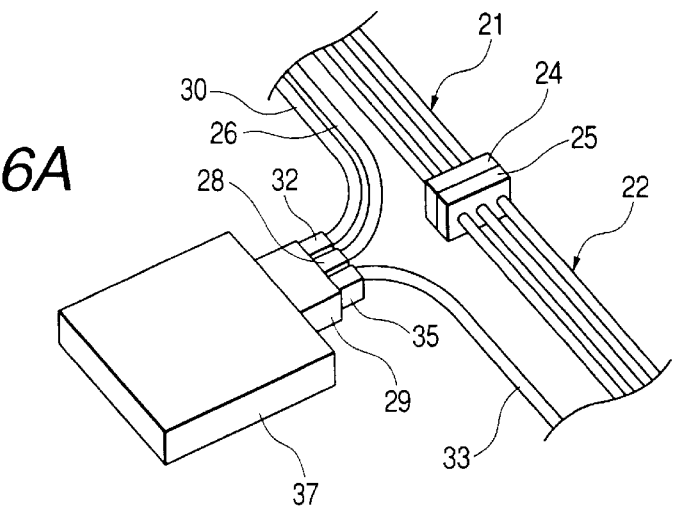
FIG. 6A is a view showing the joint connector of the first embodiment mounted on a fuse box.
Figure 6B:
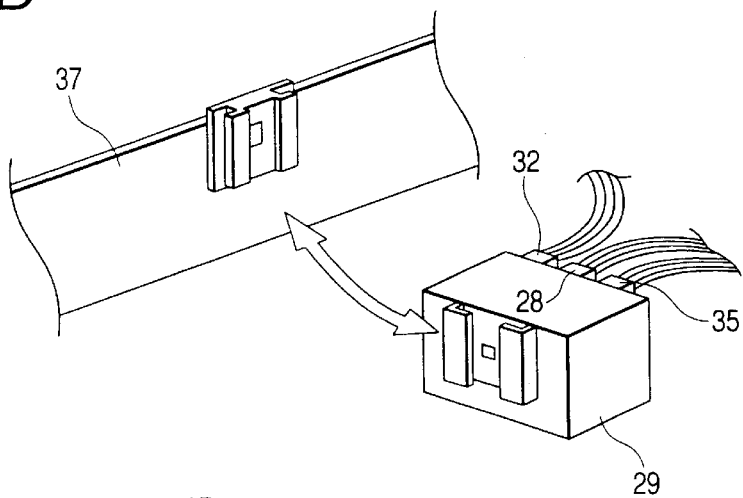
FIG. 6B is a perspective view showing a condition in which the joint connector is removed from the fuse box.
Figure 6C:
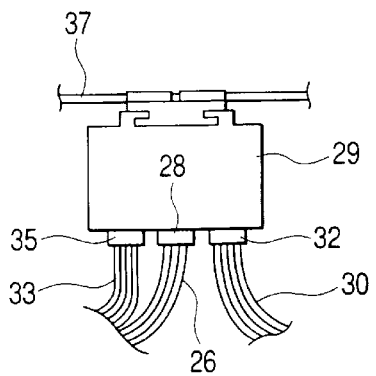
FIG. 6C is a plan view showing the joint connector mounted on the fuse box.

The joint connector 29 may be provided in the vicinity of the connectors 24 and 25, and in this embodiment the joint connector 29 may be fixedly secured to a bracket 36 mounted on the vehicle body, as shown in FIG. 5.

In this embodiment, the shielded wires 26, 30 and 33, provided respectively on the separate wire harnesses 21, 22 and 23, may be connected to the sub-connectors 28, 32 and 35, respectively, and these sub-connectors 28, 35 and 32 are connected to the joint connector 29 provided in the vicinity of the connectors 24 and 25. By doing so, the shielded wires 26, 30 and 33 of the wire harnesses 21 to 23 can be spliced over the wire harnesses 21 to 23.

Therefore, it is not necessary to effect a conventional operation in which the sheaths are removed from the end portions of the shielded wires, and then these end portions are connected to the wire-wire connectors. Therefore, the efficiency of the operation for splicing the shielded wires 26, 30 and 33 can be enhanced. In addition, since the end portions of the shielded wires 26, 30 and 33 do not need to be connected to the wire-to-wire connectors 24 and 25, the splicing position of the shielded wires 26, 30 and 33 is prevented from being limited, and the degree of freedom of the splicing position of the shielded wires 26, 30 and 33 can be enhanced.

For mounting the wire harnesses 21 to 23 on the vehicle body, the shielded wires 26, 30 and 33, provided respectively on the wire harnesses 21 to 23, are connected to the sub-connectors 28, 35 and 32, respectively, and the sub-connectors 28, 32 and 35 are connected to the joint connector 29 at the time of installing these wire harnesses on the vehicle body. By doing so, the shielded wires 26, 30 and 33 can be easily spliced. Therefore, the shielded wires 26, 30 and 33 can be easily connected to the proper portion of the joint connector 29 in a collected manner.

The joint connector 29 may be provided in the vicinity of the connectors 24 and 25 through which the wire harnesses 21 and 22 are connected together. Therefore, the connection between the wire harnesses 21 and 22 and the splicing of the shielded wires 26, 30 and 33 can be effected at one time in a common space on the vehicle body at which only a narrow installation space may be available because of the layout of the equipments and the like.

Since the degree of freedom of the splicing position of the shielded wires 26, 30 and 33 can be enhanced, the shielded wires 26, 30 and 33 can be set to generally about the same length. Therefore, when the one end portions of the shielded wires 26, 30 and 33 are spliced to the joint connector 29 while the other ends of these shielded wires 26, 30 and 33 are connected respectively to the ECUs 27, 31 and 34, the high-speed communication can be effected in such a manner that impedances characteristics relative to the ECUs 27, 31 and 34 may be kept constant through the shielded wires 26, 30 and 33, and therefore, the data communication can be effected in a stable, highly-precise manner.

More specifically, when data is transferred from the shielded wire 26 through the shielded wire 30 and when data is transferred from the shielded wire 26 through the shielded wire 33, the impedance characteristics between the ECUs 27, 31 and 34 can be kept constant since the sum of the lengths of the shielded wires 26 and 30 is equal to the sum of the lengths of the shielded wires 26 and 33. Therefore, the stable high-speed communication can be effected.

If the sum of the lengths of the shielded wires 26 and 30 is different from the sum of the lengths of the shielded wires 26 and 33, the impedance characteristics, obtained when data is transferred from the shielded wire 26 through the shielded wire 30, are not equal to the impedance characteristics obtained when data is transferred from the shielded wire 26 through the shielded wire 33. Therefore, it is considered that the stable high-speed communication can not be effected.

In this embodiment, the joint connector 29 may be mounted on the bracket 36 as shown in FIG. 5. Therefore, when the bracket 36 is mounted at an arbitrary portion of the vehicle body, the position of mounting of the connectors 24 and 25 is not limited, and the degree of freedom of the mounting position of the connectors 24 and 25 can be increased.

In this embodiment although the joint connector 29 is mounted on the bracket 36, this joint connector 29 may be mounted on, for example, a fuse box 37 fixedly mounted by screws or the like on the vehicle body within the passenger room, the engine room or the like, as shown in FIG. 6.

With this arrangement, the region at which electric power is supplied to the wire harnesses 21 to 23, and the region at which the joint connector 29 may be fixedly mounted, can be set to about the same region, and the space required for mounting the joint connector 29 can be reduced.

In this embodiment, the mounting portion for mounting the joint connector 29 may be provided at the fuse box, and the joint connector 29 may be mounted on this fuse box Thus, the joint connector 29 may be fixedly mounted through the fuse box. However, as will be surmised from FIGS. 6A–6C, the part that is mounted on the vehicle body for fixing the joint connector 29 is not limited to the fuse box but can be the control unit (ECU), disposed near to the connectors as shown in FIG. 10, or any other electrical part (e.g., a clock and a radio) mounted on the vehicle.

Figure 7A:
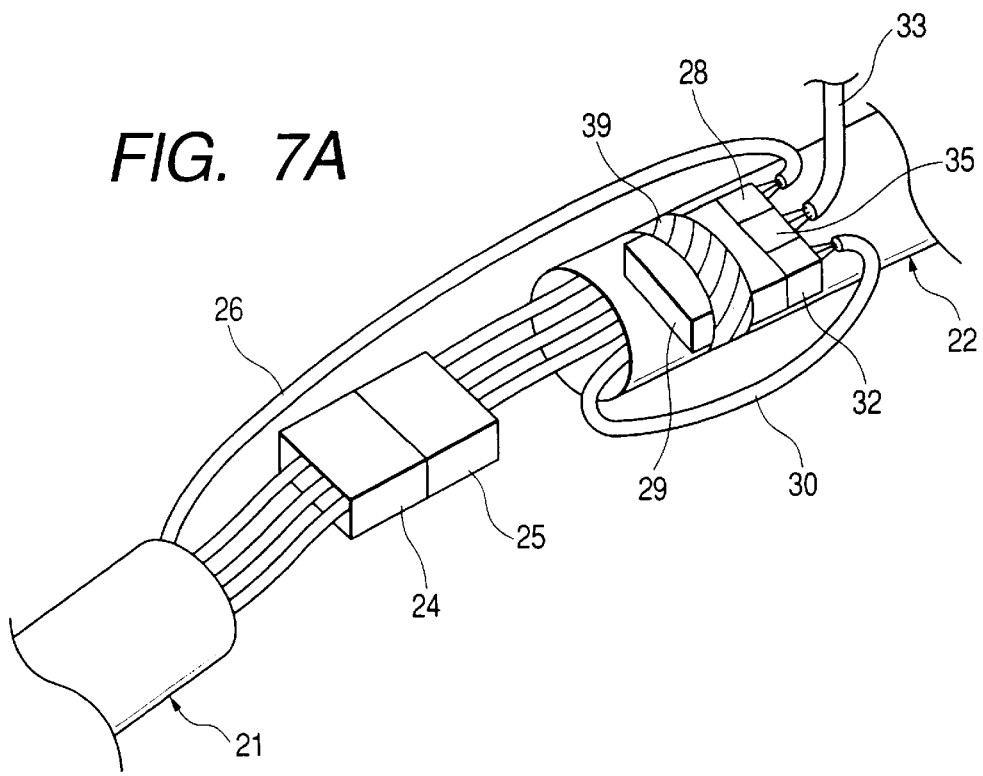
FIGS. 7A and 7B are views showing a condition in which the joint connector of the first embodiment is mounted on a wire harness.
Figure 7B:
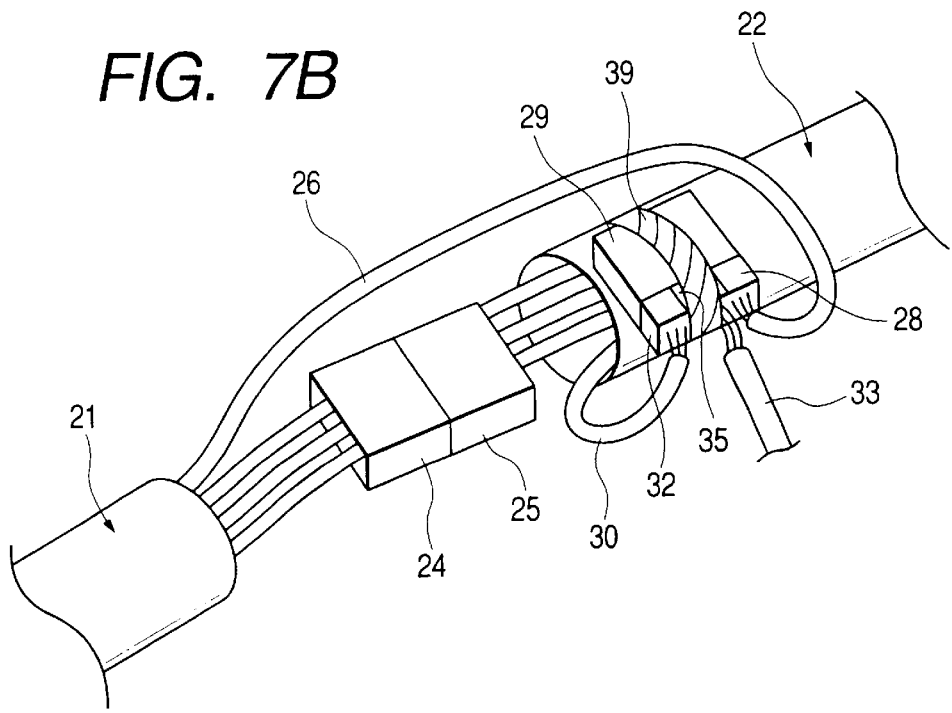

As shown in FIGS. 7A and 7B, the joint connector 29 may be mounted on an arbitrary one (e.g., the wire harness 22) of the wire harnesses, disposed near to the connectors 24 and 25, by a tape 39 or other means. With this arrangement, the joint connector 29 can be fixed without the need for mounting the bracket on the vehicle body. In the arrangement shown in FIG. 7A, the direction of connection of the sub-connectors 28, 32 and 35 to the joint connector 29 may be the same as the direction of the extending of the wire harnesses 21 and 22. In the arrangement shown in FIG. 7B, the direction of connection of the sub-connectors 28, 32 and 35 to the joint connector 29 may be perpendicular to the direction of extending of the wire harnesses 21 and 22.

In this embodiment, although the wire harness structure is divided into the three sections, the wire harness structure may be divided into four or more sections.

Figure 18B:
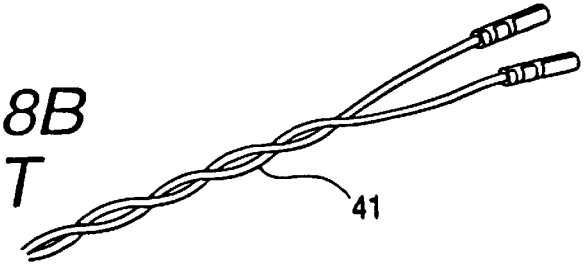
Figure 18C:
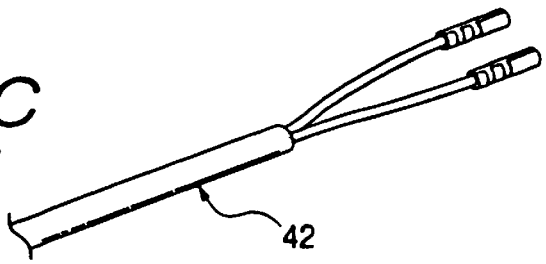

In this embodiment, although the shielded wires are used as the serial data wires, twist pair wires 41, shown in FIG. 18B, or tubed wires 42, shown in FIG. 18C, may be used.

Figure 8:
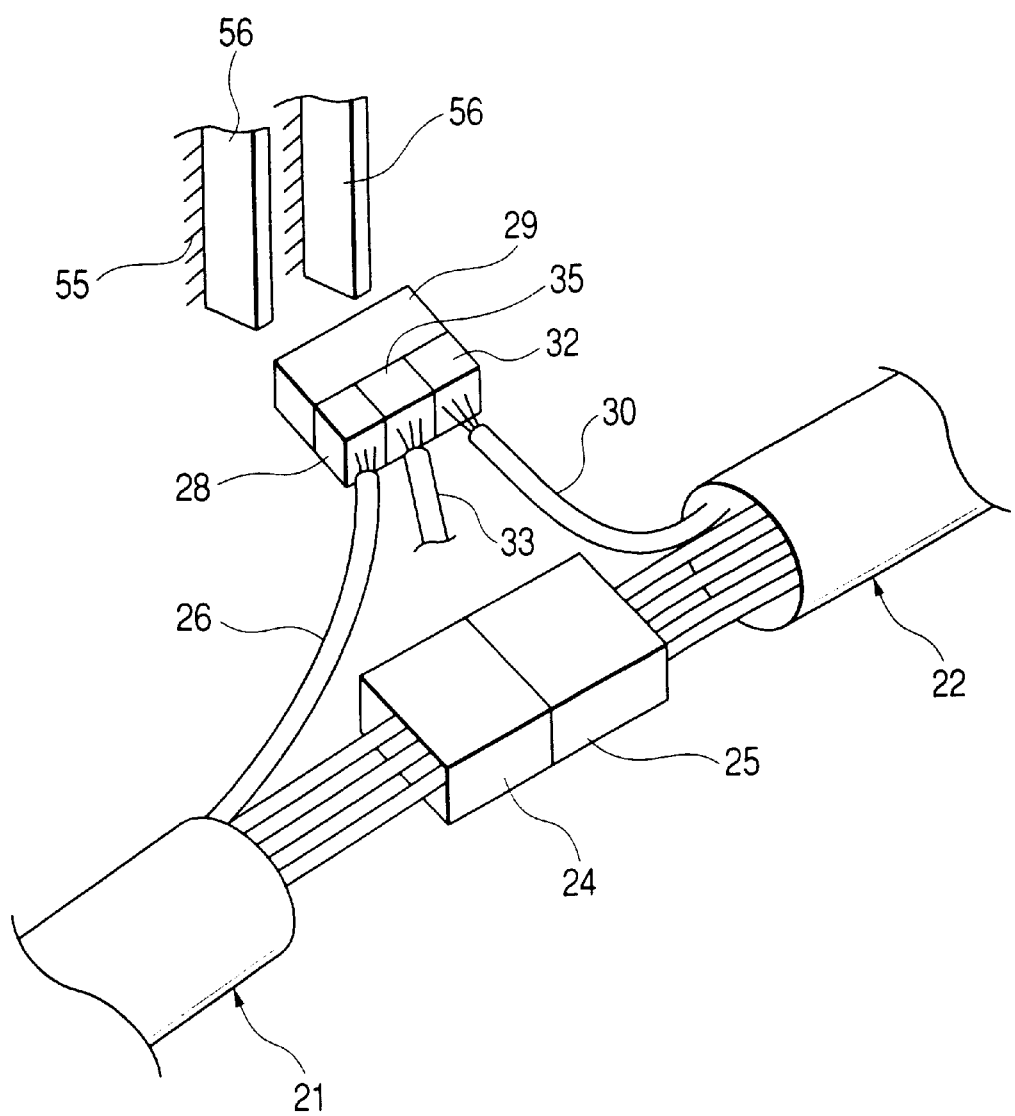
FIG. 8 is a view showing a condition in which the joint connector of the first embodiment is provided in the vicinity of an obstacle.

As shown in FIG. 8, the joint connector 29 may be provided near to an obstacle 56 mounted on the vehicle body 55. With this arrangement, the joint connector 29 can interfere directly with the obstacle 56, and the wire harness 21, 22 or 23 is prevented from interfering with the obstacle 56, and therefore is prevented from being damaged.

FIGS. 9 and 10 show a second embodiment of a wire harness structure of the present invention. For comparison purposes, FIG. 19 shows a structure merely embodying the invention as defined in aspect 1.

In FIGS. 9 and 10, solid lines denote serial data wires, each including a shielded wire, a twist pair wire (both of which are shown in FIG. 18) and/or others, and broken lines denote power wires and/or ordinary signal wires. "[ ]" denotes ends of a corrugated tube or tapes bundling the wires.

FIG. 19 shows the wire harness structure in which a large-size joint connector 81 is provided in the vicinity of a connector 80, forming a wire-to-wire connection portion for wire harnesses, and the serial data wires 83 to 87, each connected to a corresponding sub-connector 82, are spliced by the joint connector, and may be connected to electronic units 90 to 94 (an FI-ECU and other ECUs).

In this wiring structure, the operation for splicing the serial data wires can be reduced so as to enhance the efficiency of the operation. However, the serial data wires, extending from the single large joint connector 81, are connected to the units, respectively. Therefore with respect to the layout, the position of mounting of the joint connector 81 on the vehicle body, as well as a mounting space, must be secured. In addition, the installation or arrangement of the wire harnesses is complicated, and therefore there are still room for improvement of the operation efficiency.

In order to overcome these disadvantages, in FIG. 9, instead of the large joint connector 81, there are used joint connectors 51a to 51c, each containing only a bus bar 70 (serving as branch wiring) required for splicing three serial data wires, and the joint connectors 51a to 51c are located in a distributed manner in the vicinity of the wire harnesses according to the need, and the serial data wires are spliced by these joint connectors.

Reference numerals 52 to 58 denote the serial data wires which are spliced by the joint connectors 51a to 51c, and are connected to the electronic units 90 to 94 or other joint connectors.

With this construction, the joint connectors 51a to 51c can be formed into a compact, lightweight design, and therefore, the joint connectors 51a to 51c can be arranged easily by mounting the joint connectors 51a to 51c directly on the wire harnesses by a tape or on nearby electrical parts, so that the operations for installing and mounting the wire harnesses, including the serial data wires, can be effected easily, The joint connectors 51a to 51c, serving as the splicing portions for the serial data wires, can be arranged freely, and therefore, the installation of the serial data wires can be simplified, thereby enhancing the efficiency of the mounting operation. In addition, each of the relatively-expensive serial data wires can be connected to the unit in the shortest path, thereby reducing the cost.

On the other hand, in FIG. 10, a fuse box 71 and electronic units 72 and 73 are disposed near to connectors, respectively. The fuse box 71 is of such a construction that a joint connector 51a of a compact type as described above can be attached to this fuse box 71. Each of the electronic units 71 and 72 includes a joint connector portion 79 containing a bus bar 79a for splicing two serial data wires and a serial data wire trans-receiving portion, contained in the electronic unit, together.

Reference numerals 74 to 78 denote the serial data wires spliced by the joint connectors 79.

With this construction, the wire harness-connecting operation at the connector portions 81 to 83, the serial data wire-splicing operation, and the operation for connecting the electrical part (the fuse box 71 and the electronic units 72 and 73) to ordinary wires can be effected at one time, and the efficiency of the operation for mounting the structure on the vehicle body can be farther enhanced. In addition, the serial data wires for respectively transferring serial data to the electronic units 72 and 73, the electronic units 91, 92 and 93 (shown in FIG. 9) and the wires 53, 55 and 57 (shown in FIG. 9), connected respectively to the joint connectors 51a to 51c, can be omitted, and therefore the cost can be further reduced.

FIGS. 20 to 27 show a third embodiment of a wire harness structure of the present invention.

Figure 20:
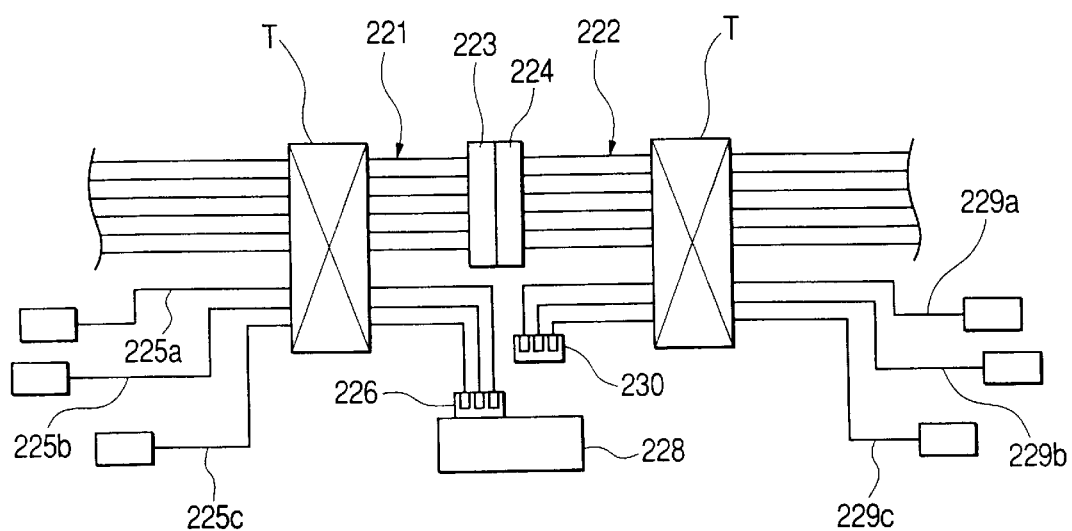
FIG. 20 is a view roughly showing the construction of a wire harness structure of the present invention.
Figure 21:
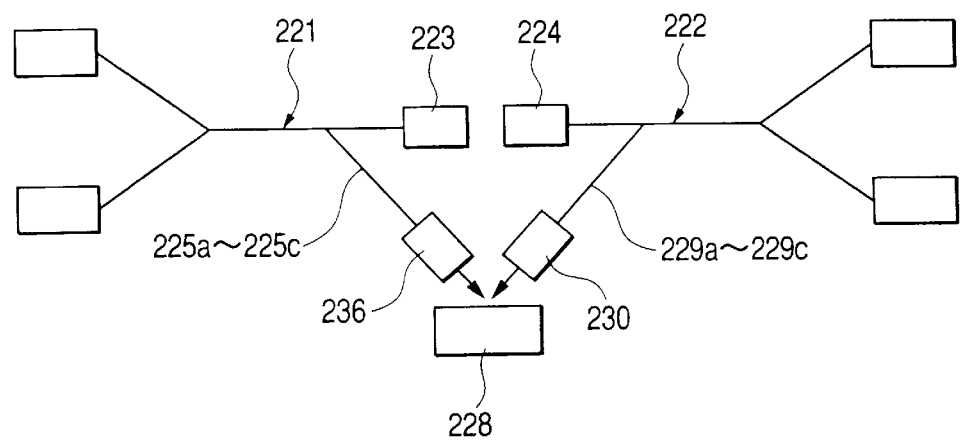
FIG. 21 is a model diagram of the wire harness structure of the above embodiments.

First, the construction will be described. In FIGS. 20 and 21, reference numerals 221 and 222 denote wire harnesses, In view of the operation efficiency and the productivity, these wire harnesses 221 and 222 of suitable lengths are provided in a divided manner, and are mounted respectively at various portions, such as an engine room, an instrument panel, door, a seat and the like. In this embodiment, the wire harness 221 is mounted in the engine room, and the wire harness 222 is mounted on the instrument panel.

Connectors 223 and 224, serving as connection means, are mounted respectively on ends of the wire harnesses 221 and 222, and the wire harnesses 221 and 222 are connected together through these connectors 224 and 225, thus providing the wire harness structure of the so-called wire-to-wire type.

Figure 22:
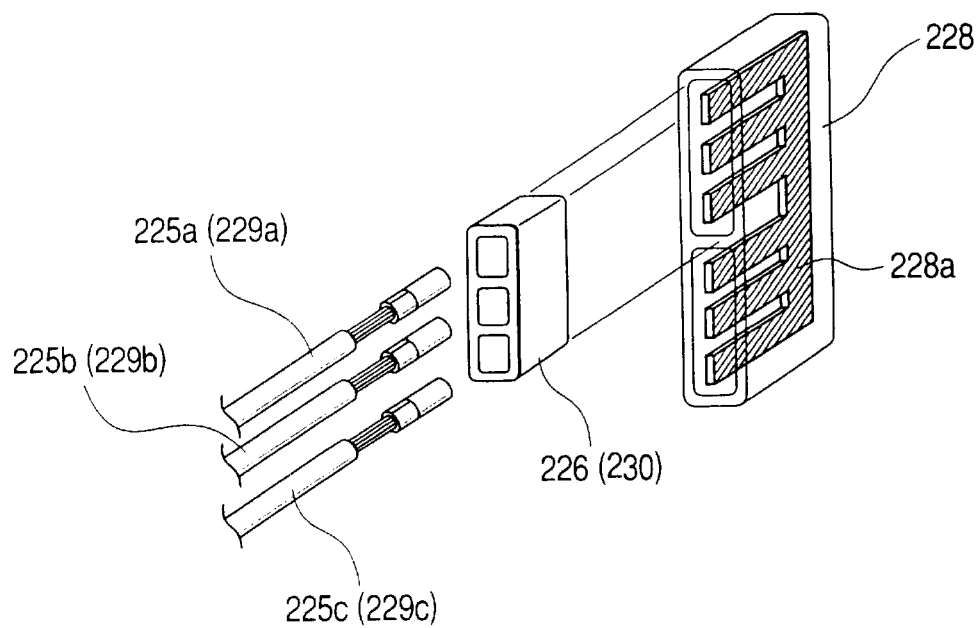
FIG. 22 is a view showing a joint connector of the above embodiments.

Wires 225a, 225b and 225c, which are part of wires forming the wire harness 221, are connected to a sub-connector 226. As shown in FIG. 22, crimp-type terminals, secured respectively to the wires 225a to 225c. are inserted into this sub-connector 226, and this sub-connector 226 is connected to a joint connector 228, containing a bus bar 228a, and by doing so, the wires 225a to 225c are spliced together by the joint connector 228.

Wires 229a, 229b and 229c, which are part of wires forming the wire harness 222, are connected to a sub-connector 230, and this sub-connector 230 has the same construction as that shown in FIG. 22. Therefore, the wires 229a to 229c are spliced together by the joint connector 228.

As a result, the wires 225a to 225c and 229a to 229c are spliced together by the joint connector 228.

In FIG. 20, although the wires 225a to 225c (229a to 229c) are shown as being separate from the wire harness 221 (222), the wires 225a to 225c (229a to 229c) are actually fixed by a tape T to the wire harness 221 (222) along an axis of the wire harness 221 (222).

Figure 23A:
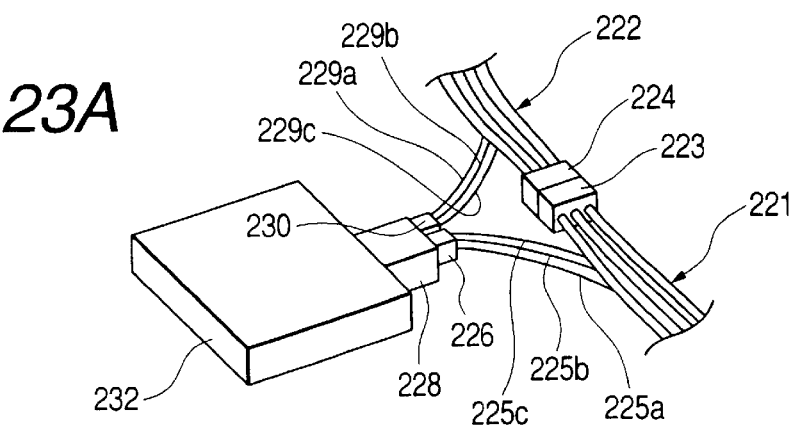
FIG. 23A is a perspective view showing the joint connector of the above embodiments mounted on a fuse box.
Figure 23B:
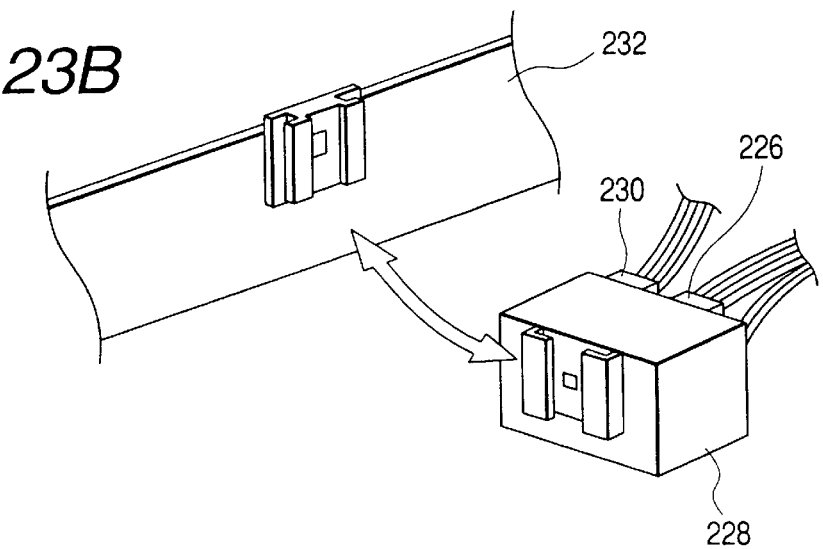
FIG. 23B is a perspective view showing a condition in which the joint connector is removed from the fuse box.
Figure 23C:
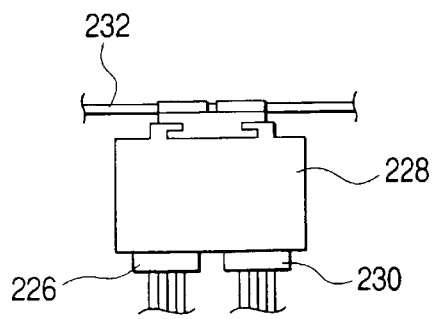
FIG. 23C is a top plan view showing the joint connector mounted on the fuse box.

The joint connector 228 is provided in the vicinity of the connectors 223 and 224. In this embodiment, since the wire harnesses 221 and 222 are installed over the engine room and the instrument panel, the joint connector 228 is mounted on, for example, a fuse box 232 fixedly mounted on a vehicle body by screws or the like within the engine room or the passenger room, as shown in FIG. 23.

In this embodiment, the mounting portion for mounting the joint connector 228 is provided at the fuse box, and the joint connector 229 is mounted on this fuse box, and thus the joint connector 228 is fixedly mounted on the vehicle body through the fuse box. However, as will be surmised from FIG. 23, the part, on which the joint connector 228 is mounted, is not limited to the fuse box, but can be an electrical part (e.g. a control unit (ECU), a clock or a radio) disposed near to the connectors 223 and 224.

In this embodiment, the wires 225a to 225c and the wires 229a to 229c, provided on the separate wire harnesses 221 and 222, are connected to the sub-connectors 226 and 230, and these sub-connectors 226 and 230 are connected to the joint connector 228 provided in the vicinity of the connectors 223 and 224. By doing so, part (225a to 225c and 229a to 229c) of the wires of the separate wire harnesses 221 and 222 can be spliced together over the wire harnesses 221 and 222.

As a result, splicing wires for connecting the wire harnesses 221 and 222 together as in the conventional construction are not necessary, and the number of the wires is reduced, and the production of the wire harness can be carried out easily.

For mounting the wire harnesses 221 and 222 on a vehicle body panel, these wire harnesses can be supplied to a manufacturer in such a manner that the wires 225a to 225c and 229a to 229c, provided on the wire harnesses 221 and 222, are connected to the sub-connectors 226 and 230, and therefore on the part of the manufacturer, the wires 225a to 225c and 229a to 229c can be easily spliced together merely by connecting the sub-connectors 226 and 230 to the joint connector 228. Therefore, the wires 225a to 225c and 229a to 229c can be easily connected to the proper portion of the joint connector 228 in a collected manner.

The joint connector 228 can be separate from the connectors 223 and 224, and therefore, the joint connector 228 can be formed into a compact. lightweight design, and a space required for mounting the joint connector 228 can be reduced.

The joint connector 228 is provided in the vicinity of the connectors 223 and 224 through which the wire harnesses 221 and 222 are connected together, and therefore, the connection between the wire harnesses 221 and 222 and the splicing of the wires 225a to 225c and 229a to 229c can be effected in a common space on the vehicle body panel at which only a narrow installation space is available because of the layout of the electrical equipments, the engine and so on.

The joint connector 228 is mounted on the fuse box 232 mounted on the vehicle body panel, and therefore the region at which electric power is supplied to the wire harnesses 221 and 222, and the region at which the joint connector 228 is fixedly mounted, can be set to about the same region, and the space, required for mounting the joint connector 228, can be reduced.

Figure 24:
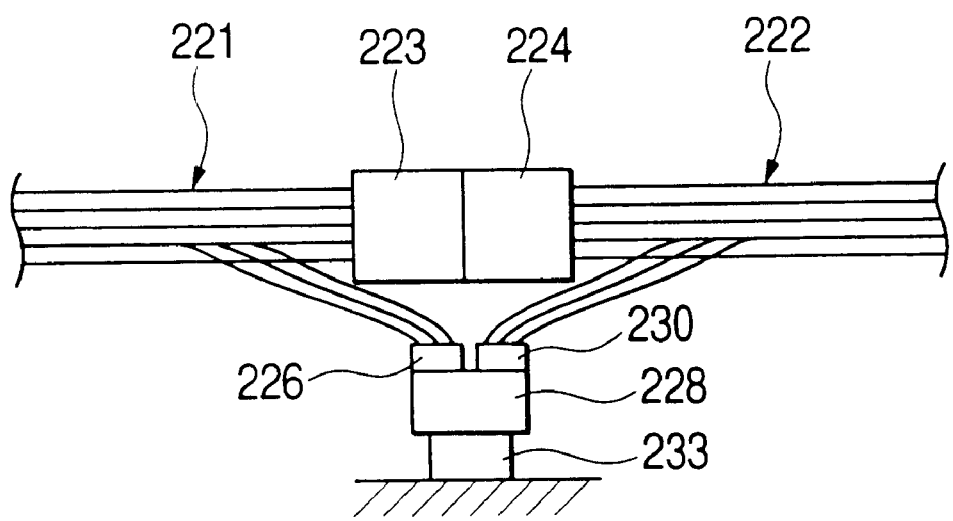
FIG. 24 is a view showing the joint connector of the above embodiment mounted on a bracket.

In this embodiment. although the joint connector 228 is mounted on the fuse box 232, this mounting portion is not limited to the fuse box, and the joint connector 228 may be mounted on a bracket 233 mounted on the vehicle body panel as shown in FIG. 24.

In this case, when the bracket is mounted on an arbitrary portion of the vehicle body panel, the position of mounting of the connectors 223 and 224 is not limited, and the degree of freedom of the mounting position of the connectors 223 and 224 can be increased.

As shown in FIGS. 25A and 25B, the joint connector 228 may be mounted on an arbitrary one (for example, the wire harness 222) of the wire harnesses, disposed in the vicinity of the connectors 223 and 224, by a tape 241 or other means. In this case, the joint connector 228 can be fixed without the need for mounting any bracket on the vehicle body panel.

It will be appreciated that the joint connector 228 can thus be mounted on the arbitrary one of the wire harnesses, disposed near to the connectors 223 and 224, by the tape or other means, since the joint connector 228 can be formed into a compact, lightweight design as described above.

As shown in FIG. 26, the joint connector 228 may be provided near to an obstacle 241 mounted on the vehicle body panel 231. With this arrangement, the joint connector 228 can interfere directly with the obstacle 241, and the wire harness 221 or 222 is prevented from interfering with the obstacle 241, and therefore is prevented from being damaged.

In this embodiment, the although the wire harness structure is divided into the two sections, the wire harness structure may be divided into three or more sections.

In the present invention, the serial data wires, provided on the plurality of wire harnesses, are connected to the sub-connectors, respectively, and these sub-connectors are connected to the joint connector provided in the vicinity of the connection means, and by doing so, the serial data wires provided on the plurality of wire harnesses, can be spliced over the wire harnesses.

As a result, the conventional operation for connecting the end portions of the serial data wires to the connectors is not necessary, and the efficiency of the operation for splicing the serial data wires can be enhanced. In addition, since it is not necessary to connect the end portions of the serial data wires to the connectors connecting the wire harnesses together, the splicing position of the serial data wires is prevented from being limited, and the degree of freedom of the splicing position of the serial data wires can be enhanced.

For installing the wire harnesses on the vehicle body, the serial data wires, provided respectively on the separate wire harnesses, are connected to the sub-connectors, respectively, and the sub-connectors are connected to the joint connector at the time of installing these wire harnesses on the vehicle body. Merely by doing so, the serial data wires can be easily spliced. Therefore, the serial data wires can be easily connected to the proper portion of the joint connector in a collected manner.

Each of the serial data wires includes a shielded wire, a twist pair wire or a tubed wire, and therefore noises can be positively removed.

The one end portions of the serial data wires may be spliced to the joint connector while the other ends of these serial data wires are connected respectively to the ECUs. In this case, when the serial data wires are set to generally the same length, the impedances characteristics between the ECUs are kept constant through the serial data wires, and by doing so, the stable data communication can be effected.

The joint connector is provided in the vicinity of the connection means through which the wire harnesses are connected together, and therefore, the connection between the wire harnesses and the splicing of the serial data wires can be effected at one time in a common space on the vehicle body at which only a narrow installation space is available because of the layout of the equipments and the like.

In the case where the electrical part is provided in the vicinity of the connection means, the joint connector can be mounted on this electrical part. By doing so, the region at which electric power is supplied to the wire harnesses, and the region at which the joint connector is fixedly mounted, can be set to the same region, and the space required for mounting the joint connector can be reduced.

When the bracket is mounted on an arbitrary portion of the vehicle body, the position of mounting of the connection means is not limited, and the degree of freedom of the mounting position of the connection means can be increased.

When the joint connector is mounted on the arbitrary wire harness disposed near to the connection means, the joint connector can be fixed without the need for mounting any bracket on the vehicle body.

The joint connector contains the branch wiring for splicing a maximum of three serial data wires, and therefore the joint connector can be formed into a compact, lightweight design. Thus, the joint connector can be arranged easily by mounting the joint connector directly on the wire harness by a tape or on the nearby electrical part, so that the operations for installing and mounting the wire harnesses, including the serial data wires, can be effected easily The joint connectors, serving as the splicing portions for the serial data wires, can be arranged freely, and therefore the installation of the serial data wires can be simplified, thereby enhancing the efficiency of the mounting operation. In addition, each of the relatively-expensive serial data wires can be connected to the unit in the shortest path, thereby reducing the cost.

The joint connector may be formed integrally with the electronic unit, and contains the branch wiring for splicing two serial data wires and the internal circuit of the electronic unit, and therefore the wire harness-connecting operation at the connector portion, the serial data wire splicing operation, and the operation for connecting the electronic unit to ordinary wires can be effected at one time, and the efficiency of the operation for mounting the structure on the vehicle body can be further enhanced. In addition, the number of the serial data wires for respectively transferring serial data to the electronic units can be reduced, thereby further reducing the cost.

Further, according to this invention, part of the wires of the divided wire harnesses are connected to the sub-connectors, and these sub-connectors are connected to the joint connector provided in the vicinity of the connection means. By doing so, part of the wires of the divided wire harnesses can be spliced over the wire harnesses.

As a result, splicing wires for connecting. the wire harnesses together as in the conventional construction are not necessary, the number of the wires is reduced, and the production of the wire harness can be carried out easily.

For mounting the wire harnesses on a vehicle body, these wire harnesses can be supplied to a manufacturer in such a manner that part of the wires, provided on the wire harnesses, are connected the sub-connectors, and therefore on the part of the manufacturer, the wires can be easily spliced together merely by connecting the sub-connectors to the joint connector. Therefore, the wires can be easily connected to the proper portion of the joint connector in a collected manner.

The joint connector may be provided in the vicinity of the connection means through which the divided wire harnesses are connected together, and therefore, the connection between the wire harnesses and the splicing of the wires ran be effected in a common space on the vehicle body at which only a narrow installation space is available because of the layout of electrical equipments, an engine and the like.

The joint connector for splicing purposes can be separate from the connection means, and therefore the joint connector of high versatility can be formed into a compact, lightweight design the cost is low, and the installation space for the joint connector can be reduced.

According to this invention, if any electrical part, such as a fuse box, may be provided in the vicinity of the connection means, the joint connector is mounted on this electrical part. By doing so, the region at which electric power is supplied to the wire harnesses, and the region at which the joint connector is fixedly mounted, can be set to about the same region, and the space required for mounting the joint connector can be reduced.

According to this invention, when the bracket is mounted on an arbitrary portion of the vehicle body, the, position of mounting of the connection means is not limited, and the degree of freedom of the mounting position of the connection means can be increased.

According to the invention, the joint connector can be fixed without the need for mounting any bracket on the vehicle body.

What is claimed is:

1. A vehicle wiring construction, comprising:
    a plurality of wire harnesses each having a connector, said wire harnesses configured to be connected to each other when said connectors are coupled to each other, each said wire harness having at least one joint wire attached thereto, and
    at least one joint connector configured to hold and electrically interconnect said joint wires that are respectively attached to said wire harnesses, wherein said at least one joint connector is configured to be positioned away from said connectors, whereby said joint wires can be connected independently to said at least one joint connector without being connected to said connectors.

2. The vehicle wiring construction according to claim 1, wherein said at least one joint wire comprises at least one data communication wire, wherein said data communication wires are configured to respectively extend between said at least one joint connector and electronic control units to transmit data to a respective one of said electronic control units, whereby said electronic control units can be intercommunicated via said at least one joint connector.

3. The vehicle wiring construction according to claim 2, wherein said data communication wires are of substantially the same length, whereby electrical characteristics of data communication between said electronic control units can be substantially the same.

4. The vehicle wiring construction according to claim 3, further comprising a sub-connector for receiving and holding said at least one joint wire attached to said sub wire harness, wherein said sub-connector is configured to be accommodated within said joint connector.

5. The vehicle wiring construction according to claim 4, wherein said at least one joint connector is mounted on an electrical connection box positioned in the proximity of said end connectors.

6. The vehicle wiring construction according to claim 4, wherein said at least one joint connector is formed unitarily in one piece with an electrical connection box positioned in the proximity of said end connectors, and forms a joint wiring configuration to electrically interconnect said joint wires and an internal circuit of said electrical connection box.

7. A wire harness structure in which a wire harness with at least one serial data wire for effecting a serial data communication is divided into a plurality of wire harnesses, said divided wire harnesses being connected together through connection means, and part of said serial data wire being spliced over said plurality of divided wire harnesses without being connected to said connection means, said wire harness structure comprising:

a sub-connector to which ends of said part of said serial data wire are connected, and a joint connector for splicing said serial data wires disposed respectively within said sub-connector.

8. The wire harness structure according to claim 7, wherein said at least one serial data wire is a shielded wire.

9. The wire harness structure according to claim 7, wherein said at least one serial data wire is a twist pair wire.

10. The wire harness structure according to claim 7, wherein said at least one serial data wire is a tubed wire.

11. The wire harness structure according to claim 7, wherein said serial data wires are set to about the same length.

12. The wire harness structure according to claim 7, wherein said joint connector is provided in the vicinity of said connection means.

13. The wire harness structure according to claim 7, wherein said joint connector is mounted on an electrical part fixedly mounted on a vehicle body.

14. The wire harness structure according to claim 7, wherein said joint connector is mounted on a bracket mounted on a vehicle body.

15. The wire harness structure according to claim 7, wherein said joint connector is mounted on an arbitrary one of said wire harnesses disposed in the vicinity of said connection means.

16. The wire harness structure according to claim 7, wherein said joint connector contains a branch wiring for splicing a maximum of three serial data wires.

17. The wire harness structure according to claim 7, wherein said joint connector is formed integrally with an electronic unit and contains a branch wiring for splicing at least two serial data wires and an internal circuit of said electronic unit.

18. A wire harness structure in which a wire harness with a plurality of wires is divided into a plurality of wire harnesses, said divided wire harnesses being connected together through connection means, said structure comprising:

sub-connectors, which are separate from said connection means, and to which ends of part of the wires of said divided wire harnesses are connected, and a joint connector provided in the vicinity of said connection means so as to splice the wires disposed within said sub-connectors;

wherein said part of the wires of said wire harnesses are spliced together by said joint connector over said divided wire harnesses.

19. The wire harness structure according to claim 18, wherein said joint connector is mounted on an electrical part fixedly mounted on a vehicle body.

20. The wire harness structure according to claim 18, wherein said joint connector is mounted on a bracket fixedly mounted on a vehicle body.

21. The wire harness structure according to claim 18, wherein said joint connector is mounted on an arbitrary one of said wire harnesses disposed in the vicinity of said connection means.

* * * * *